(12) United States Patent
Erdosi et al.

(10) Patent No.: US 7,966,526 B2
(45) Date of Patent: Jun. 21, 2011

(54) SOFTWARE EVENT RECORDING AND ANALYSIS SYSTEM AND METHOD OF USE THEREOF

(75) Inventors: Thomas Erdosi, Warngau (DE); Malte Klassen, Munich (DE)

(73) Assignee: Galileo Tools GmbH, Munich (DE)

( * ) Notice: Subject to any disclaimer, the term of this patent is extended or adjusted under 35 U.S.C. 154(b) by 284 days.

(21) Appl. No.: 12/100,807

(22) Filed: Apr. 10, 2008

(65) Prior Publication Data
US 2008/0256399 A1 Oct. 16, 2008

Related U.S. Application Data

(60) Provisional application No. 60/907,592, filed on Apr. 10, 2007.

(51) Int. Cl.
*G06F 11/00* (2006.01)
(52) U.S. Cl. .......................................... 714/47
(58) Field of Classification Search .............. 714/18, 714/20, 21, 25, 27, 30, 33, 37, 38, 39, 45–48, 714/57
See application file for complete search history.

(56) References Cited

U.S. PATENT DOCUMENTS

| | | | |
|---|---|---|---|
| 6,167,358 A * | 12/2000 | Othmer et al. | 702/188 |
| 6,539,396 B1 * | 3/2003 | Bowman-Amuah | 707/769 |
| 6,615,375 B1 * | 9/2003 | Mounes-Toussi et al. | 714/54 |
| 7,290,181 B2 * | 10/2007 | D'Angelo et al. | 714/48 |
| 7,477,960 B2 * | 1/2009 | Willis et al. | 700/121 |
| 7,496,916 B2 * | 2/2009 | Dettinger et al. | 718/100 |
| 2005/0188273 A1 * | 8/2005 | Angelo et al. | 714/39 |
| 2006/0184264 A1 * | 8/2006 | Willis et al. | 700/108 |
| 2007/0208784 A1 * | 9/2007 | Beeston et al. | 707/203 |
| 2010/0010692 A1 * | 1/2010 | Broderick et al. | 701/3 |

* cited by examiner

*Primary Examiner* — Nadeem Iqbal
(74) *Attorney, Agent, or Firm* — Arent Fox LLP

(57) ABSTRACT

A software service running in the background of an operating system and used by a user to record metadata and screen shots of the user interface screens in an operating system whenever errors occur in the operating system or in any application running on the operating system. The software service also manages the recorded data to ensure resources are used efficiently to minimize the use of storage space in the recording location or buffer. The software running in the background monitors, filters and logs programs and user actions, and if a problem occurs within the monitored software, a problem report can be created for a support team to analyze and include corresponding recorded data. The suggested selection of recorded data can be displayed and edited by the user.

22 Claims, 32 Drawing Sheets

FIG.1A

FIG.2B
FIG.3B
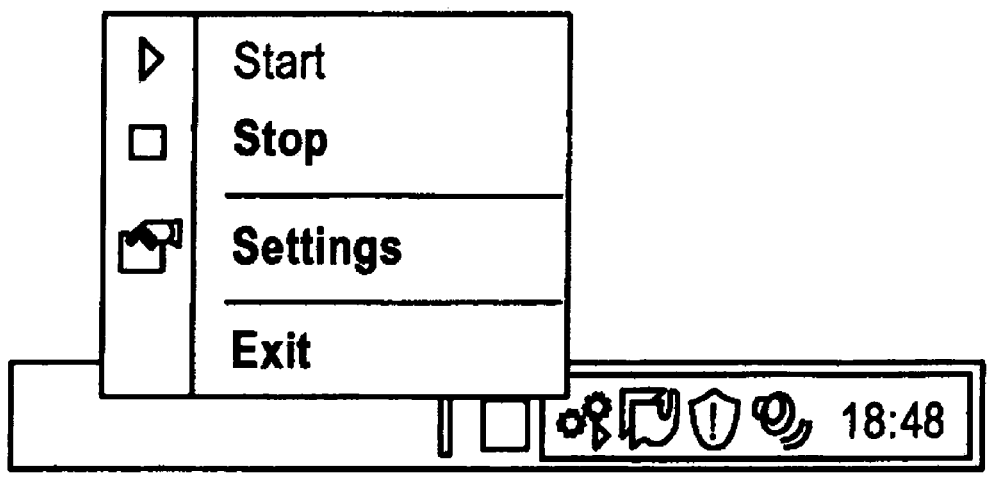

| | |
|---|---|
| Local system time | Freitag, 23. Februar 2007 - 18:59:48 |
| Application server | GAL-MCH-110 |
| System | G01 |
| Client | 100 |
| User | ERDOESI |
| Language | EN |
| Transaction code | S000 |
| Program | SAPLS004 |
| Dynpro Number | 1000 |
| Dynpro Title | Create Document and Send |
| Response time | 78 ms |
| Low speed connection | False |
| Codepage | 1160 |
| SAPgui version | 6404.14 |
| Session ID | 9804B7BFCA824916B3CE7666C4F65937 |

Data Recording Plugin for SAPgui

Data Recording Plugin for Microsoft Internet Explorer

SOFTWARE EVENT RECORDING AND ANALYSIS SYSTEM AND METHOD OF USE THEREOF

This invention claims priority from U.S. Patent Application No. 60/907,592, filed in the U.S. Patent and Trademark Office on Apr. 10, 2007 and titled "Software Event Recording and Analysis System and Method of Use Thereof," and which is herein incorporated by reference in its entirety.

BACKGROUND OF THE INVENTION

1. Field of the Invention

Aspects of the present invention relate to methods and systems for recording data relating to errors and other events occurring during operation of software applications.

2. Background of the Technology

There is an unmet need for methods and systems for tracking, identifying, and addressing errors and other events occurring in software applications.

SUMMARY OF THE INVENTION

Aspects of the present invention comprise software (also interchangeably referred to herein as "software service") for recording information relating to an error occurrence in an underlying software program and can be analogized to a "flight recorder" for aircraft emergency situation recording. As with the aircraft flight recorder, the software service in accordance with aspects of the present invention is designed to record recent actions taken by a user and activity of the underlying software program being used by the user, in order, among other things, to assist an analyst or other reviewer of such records in determining when and what error or other event has occurred so that such event may be addressed, as appropriate. In order to keep the amount of required memory at a fixed level, in some variations, the software service constantly overwrites data that is outdated or no longer required.

Among other things, aspects of the present invention therefore reduce some of the primary costs with analyzing software errors, which involve the time and effort typically needed to reproduce the situation that caused the error or other function to be analyzed. Some variations of the present invention allow a detailed failure analyses and offer the possibility to develop technical changes that can avoid the occurrence of the problem in future.

When an error or other unexpected action occurs in an operating software program, for example, the user typically does not know what action (either by the user or the software) directly led to the error or other unexpected action. For most existing software applications, the only information that may be obtained for analysis is static information with regard to activity performed by the software immediately following the event to be analyzed. In most cases, such post event static information is not very useful to the analyst in determining the problem that occurred to cause the event. What is needed is information on the user's actions and the software activity leading up to the event. Aspects of the present invention fill this need, as well as others, by providing a continuous retrievable record of user actions and software activity, which may be used to fill in the gap of information prior to the event (e.g., error) occurring.

In one variation of the present invention, a software service runs in the background of the operating software being used by the user. The software service records, among other things, metadata, and screen shots of the user interface screens in the operating software. In addition, the software service manages the recorded data to ensure resources are used efficiently. For example, data may be recorded in a particular location or buffer, and data recorded in the location or buffer may be periodically purged. Among other things, this approach minimizes the use of storage space in the recording location or buffer. The program that is running in the background monitors, filters and logs programs and user actions. In addition, it determines points in time to take screenshots of certain significant user action. Additional context specific information can be automatically or otherwise added to these screenshots, if needed. If a problem occurs within the monitored software, the user can create a problem report for a support team to analyze and include corresponding recorded data. In order to ensure full transparency concerning the transferred information, the user can display and edit the suggested selection of recorded data. Confidential information can be easily removed, and additional information can be added. Changes that would result in manipulation of the recorded data are prevented. The memory occupied by the recorded data is constantly reorganized, in order to avoid unnecessary memory consumption.

In addition, the software service may perform other operations and provides information for other purposes, such as determining the most likely data of relevance to a particular event that has occurred. This determination may be made, for example, using probability information or scoring of the data available. Variations of the present invention also include features to allow the user to maintain confidentiality throughout operations of the software service and any subsequent analysis.

Aspects of the present invention may also be implemented using a plugin-based concept. Plugins for different target applications can be installed or removed at any time. One illustrative plugin in accordance with an embodiment of the present invention supports an SAP-Frontend called SAPgui. Plugins for additional application are provided in accordance with other variations of the present invention. As soon as a technical problem occurs within an application, or when the user starts creating a problem report, for example, the affected application of the prior art usually analyzes its current state in order to submit this information, together with the problem report. Nevertheless, the reconstruction of the root cause can turn out to be very complex or even impossible to determine. One reason for this failure lies in the fact that there is no recording of the activities that lead to the problematic constellation. In many cases, the end-user is not able to give any information that could be used for further analysis. This information gap is effectively closed by the pro-active recording of user actions with aspects of the present invention. Thus, the Proactive Data Recording Service feature, in accordance with some variations of the present invention, contributes to the lowering of the cost of support and error analysis.

Additional advantages and novel features will be set forth in part in the description that follows, and in part will become more apparent to those skilled in the art upon examination of the following or upon learning by practice of aspects of the present invention.

BRIEF DESCRIPTION OF THE FIGURES

In the drawings:

FIGS. 1A and 1B show exemplary login and welcome screens, respectively, for a representative SAP software program for use in accordance with an illustrative variation of the present invention;

FIG. 2B shows a closeup view of the exemplary icon of FIG. 2A;

FIG. 3B presents a close-up view of the popup window of FIG. 3A;

DETAILED DESCRIPTION OF PREFERRED EMBODIMENTS

One variation of the present invention may be illustrated by showing software service in accordance with aspects of the present invention operating in conjunction with an exemplary SAP front end software application, which is designed to operate in conjunction with a unicenter service desk back end to support the SAP software. This exemplary application is intended to illustrate only one implementation of the present invention.

In the exemplary SAP implementation, a user working at a personal computer (PC) or other terminal, operates the SAP software with the software service in accordance with aspects of the present invention operating in the background of the terminal. The software service records user actions and metadata, among other information, and stores the recorded information in a storage buffer. If a problem occurs (e.g., system crash due to operation performed in the SAP program and/or as a result of an action or actions by the user), the stored data in the buffer may be used to support analysis of the problem that occurred.

FIGS. 1A-20 show views of screen shots of representative operations in accordance with an exemplary implementation of one variation of the present invention. (An overview of operation in accordance with aspects of the present invention in conjunction with operation of an exemplary SAP software program, is also described further below).

Figure 1A:
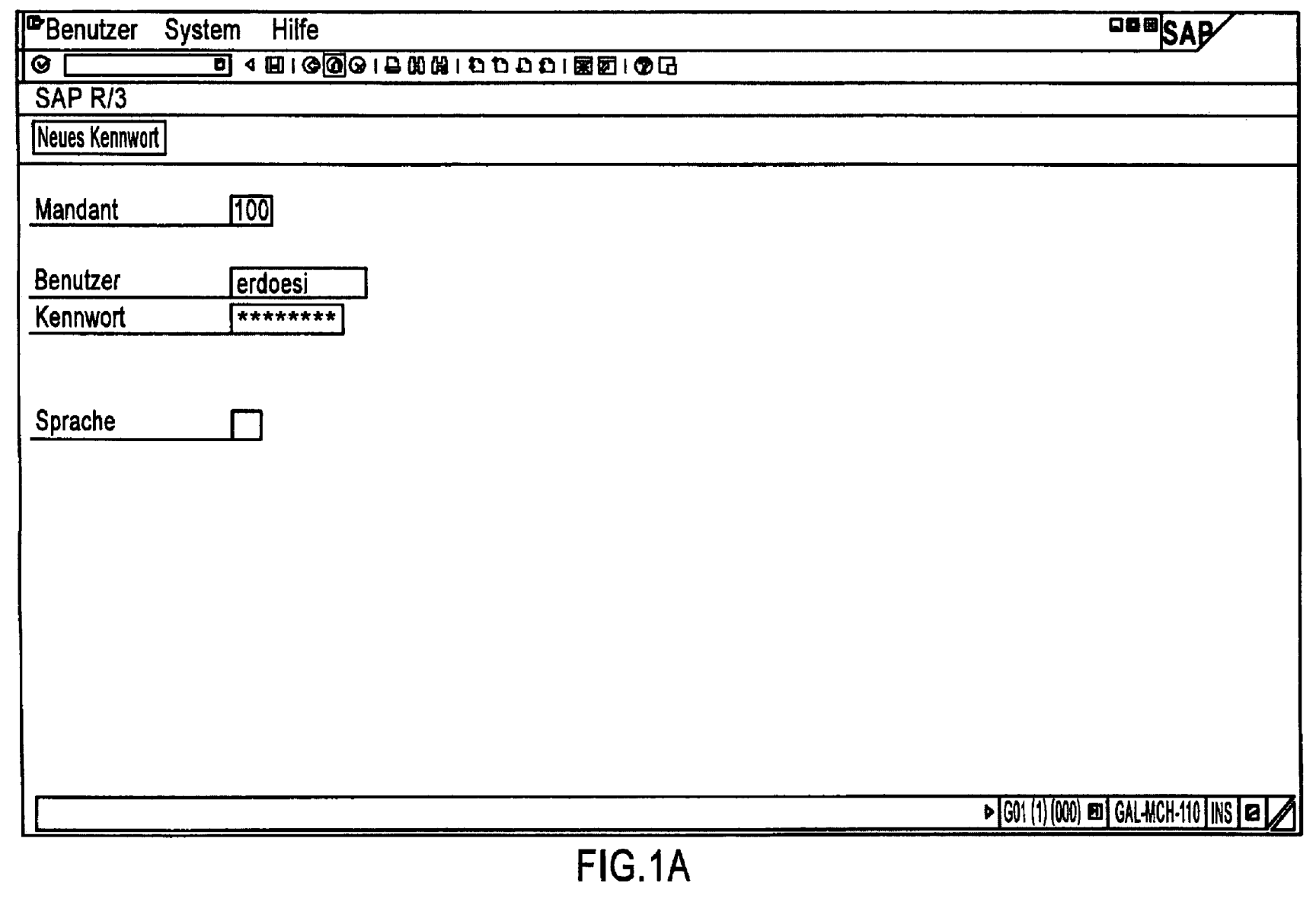
Figure 1B:
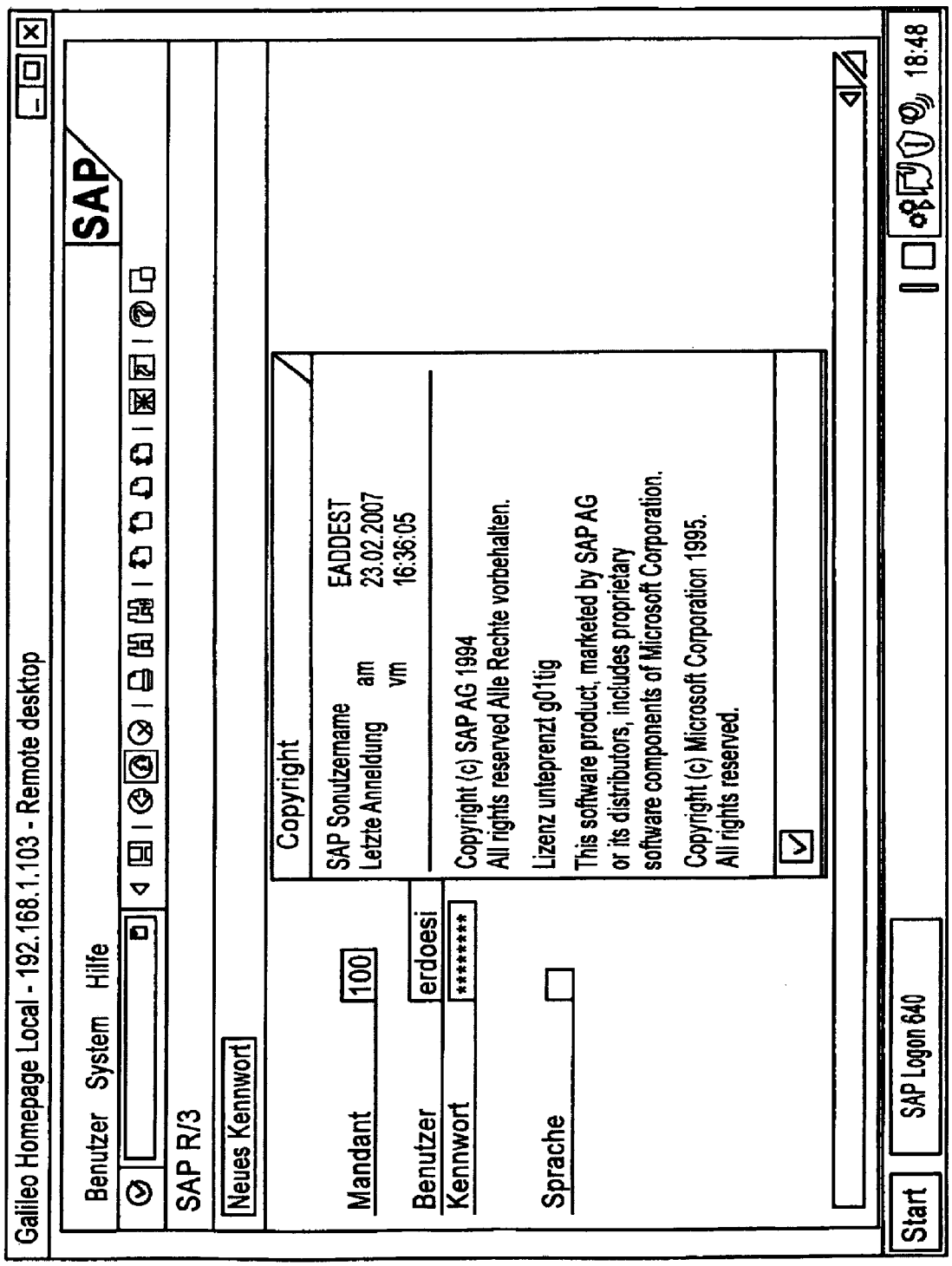

FIGS. 1A and 1B show exemplary login and welcome screens (partially in German), respectively, for using the representative SAP software program.

Figure 2A:
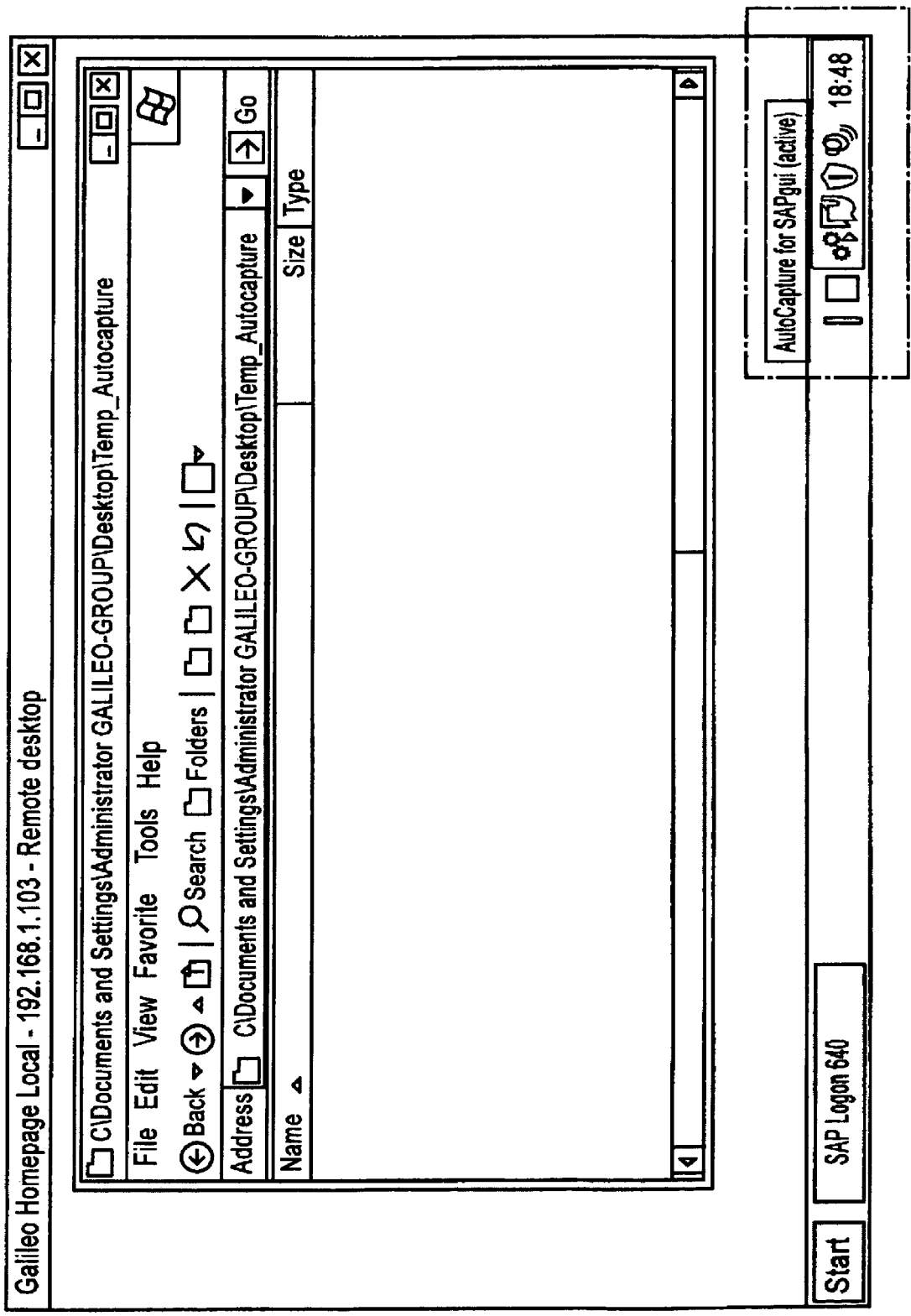
FIG. 2A shows a representative screen shot of system enablement for the exemplary software service, in accordance with aspects of the present invention.

FIG. 2A shows a representative screen shot of system enablement for the exemplary software service, in accordance with aspects of the present invention. In FIG. 2A, the service is enabled by selecting an icon within the operating environment for the terminal. FIG. 2B shows a closeup view of the exemplary icon of FIG. 2A. In one variation, when the software service is enabled, the icon changes color (e.g., becomes green) and when disabled, the icon reverts to another color (e.g., light blue).

Figure 3A:
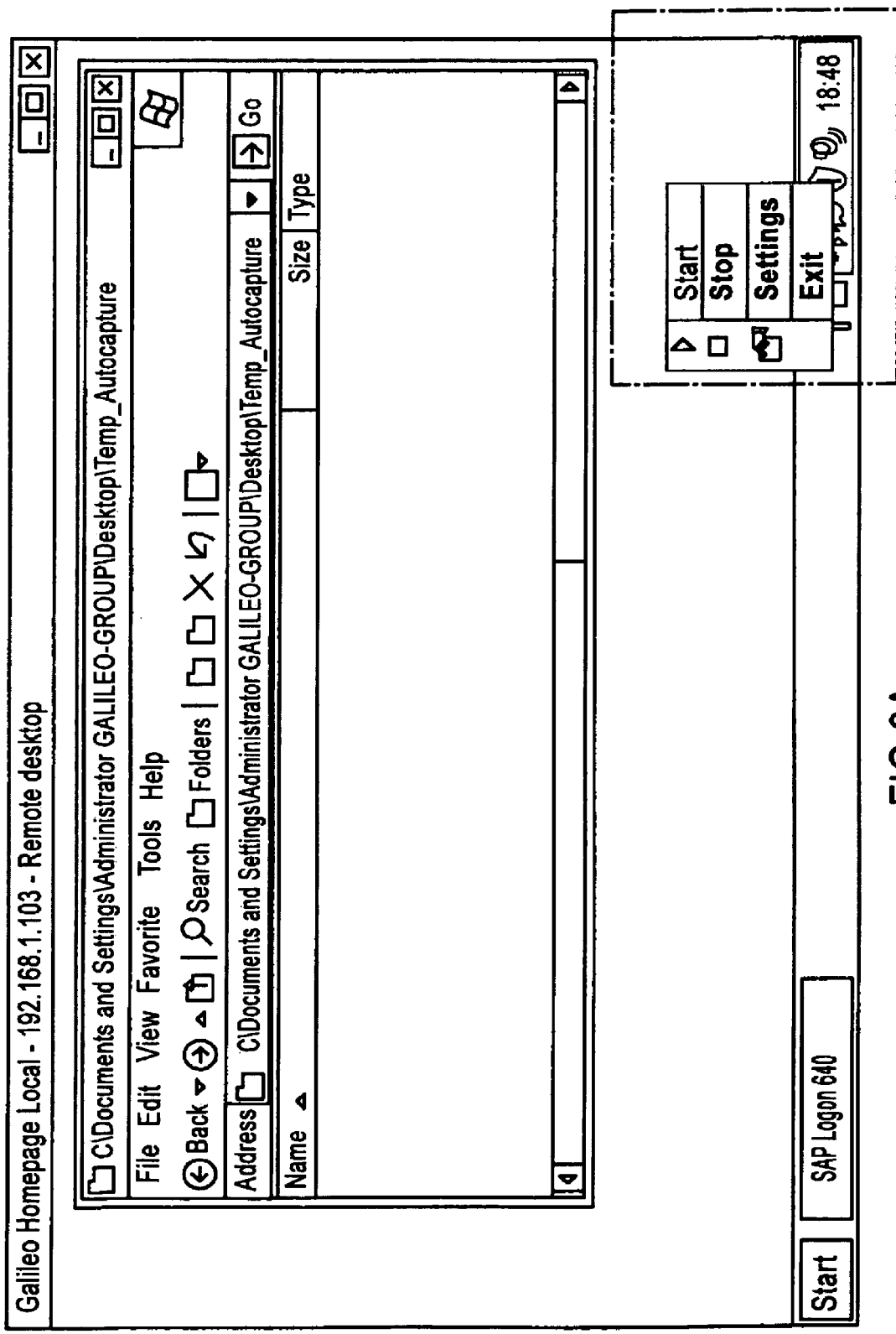
FIG. 3A shows a popup window for various user selections for enabling software service functions, in accordance with aspects of the present invention.
Figure 4:
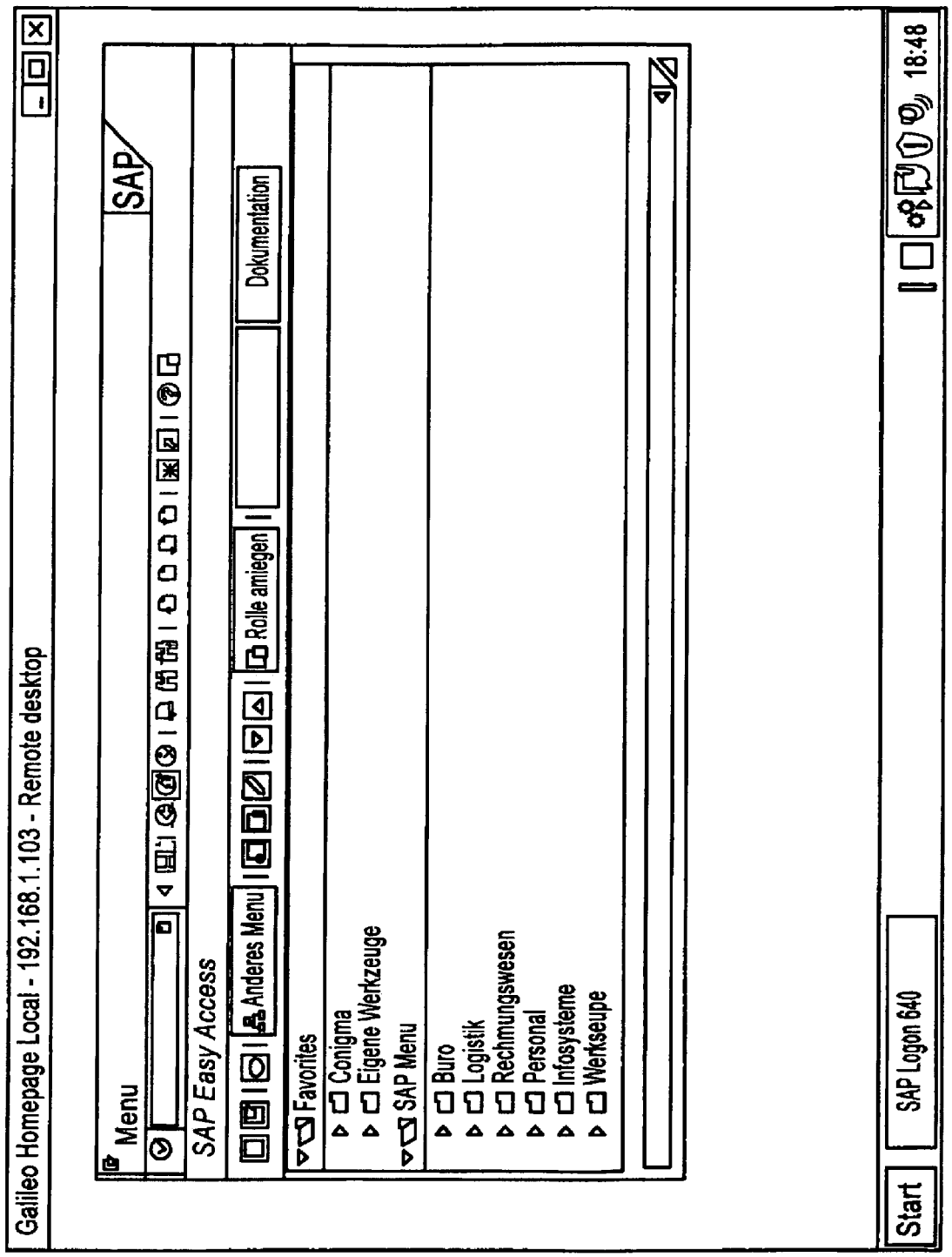
FIGS. 4-12 show sample various user operations, such as task list functions, in the representative SAP software application, for use with aspects of the present invention.
Figure 5:
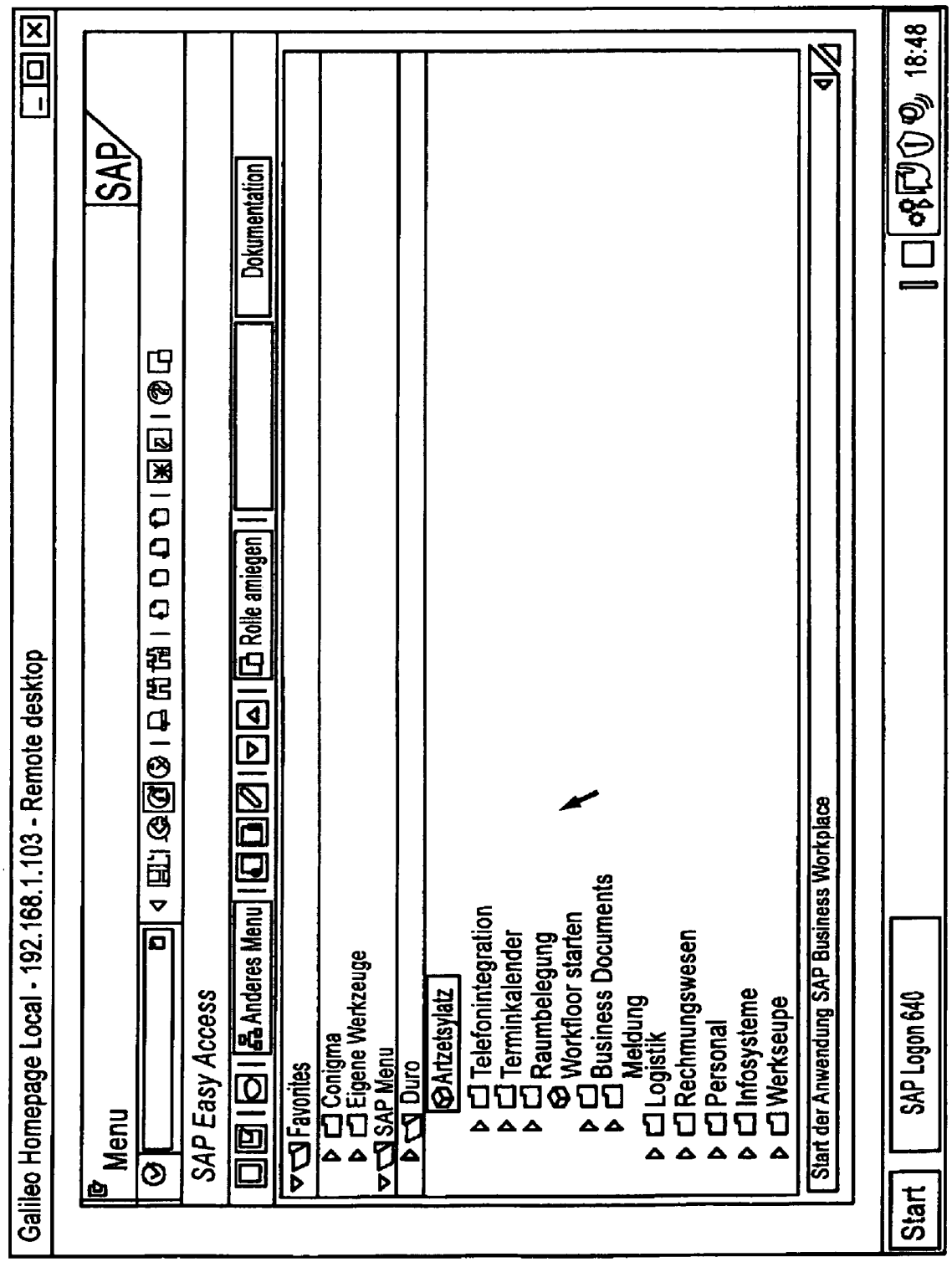

Upon selection of the icon, for example, an exemplary popup window for various user selections for enabling software service functions occurs, as shown in FIG. 3A. The popup window is shown in close-up in FIG. 3B. Operation of the software service (e.g., recording functions) may then be started and stopped using the popup window selectable options. In addition, the settings for software service operation may be set.

Alternatively, for example, operation of the service function may be set to occur automatically upon a user operation occurring (e.g., each time the user accesses the SAP software).

FIGS. 4-12 show sample various user operations, such as task list functions, performed in the representative SAP software application, one or all of which may be recorded using the software service in accordance with aspects of the present invention.

Figure 13A:
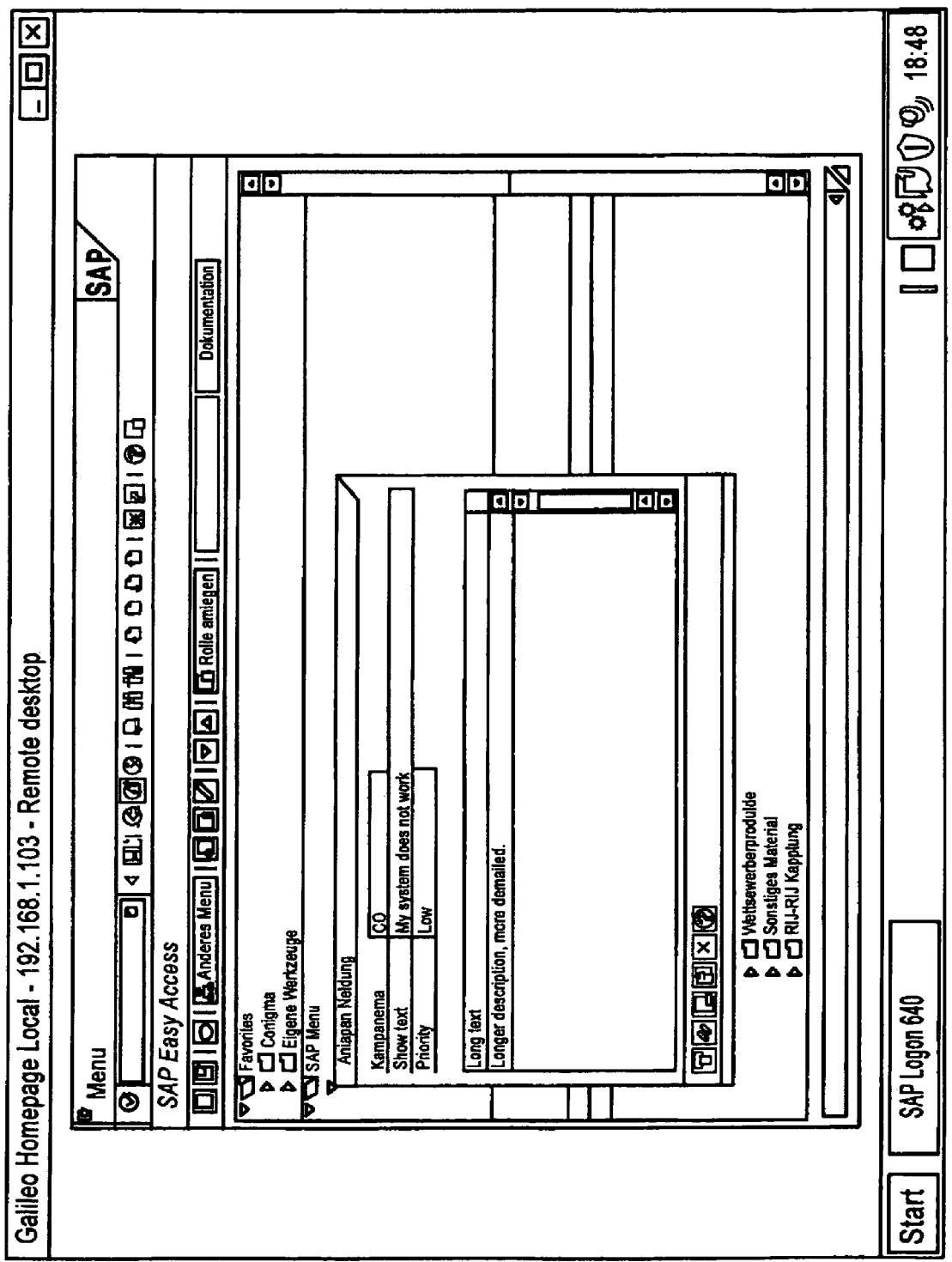
FIG. 13A shows an exemplary event reporting popup screen within the SAP software application that has been selected by the user to report a system error or other event, in accordance with aspects of the present invention.

FIG. 13A shows an exemplary event (e.g., error) reporting popup screen within the SAP software application that has been selected by the user to report a system error or other event. In the reporting popup screen, the user is able to identify the event and provide further details (e.g., details on the error that has occurred).

Figure 13B:
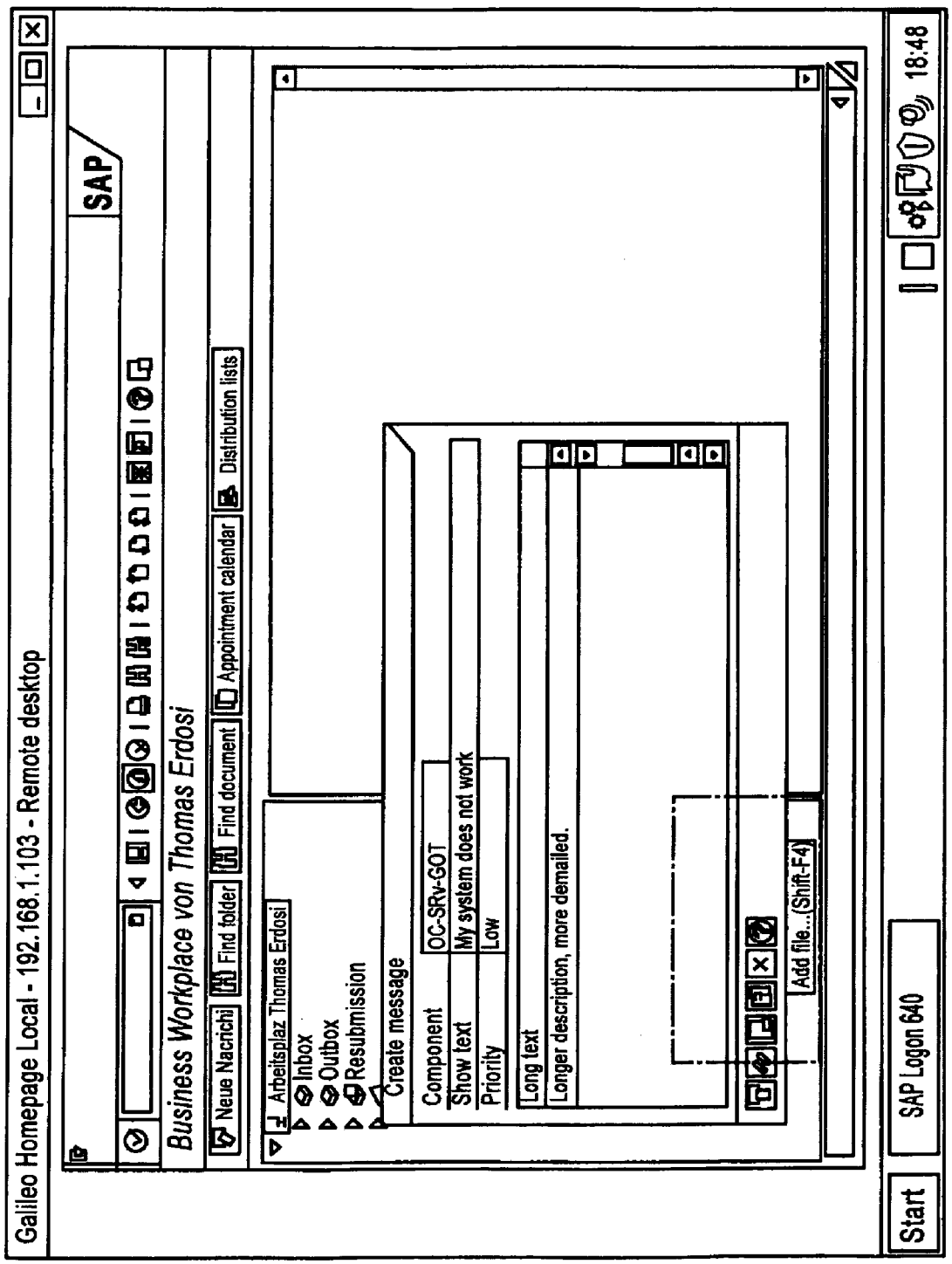
FIG. 13B highlights an icon selectable feature within the popup screen of FIG. 13A that allows addition of recorded data to an event report, in accordance with aspects of the present invention.
Figure 14:
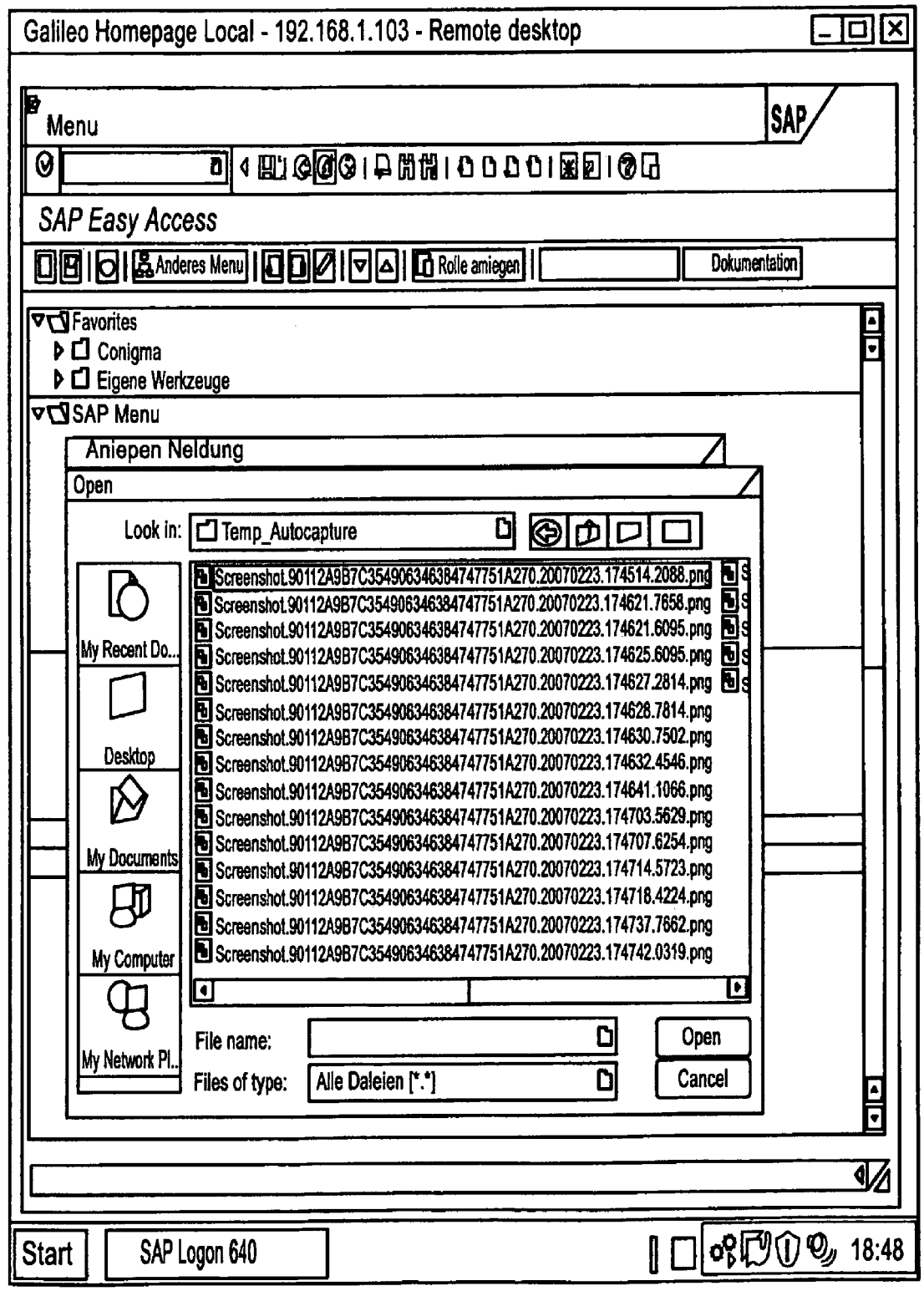
FIG. 14 shows an exemplary screen shot illustrating selection of data to be added to an event report, in accordance with aspects of the present invention.
Figure 15A:
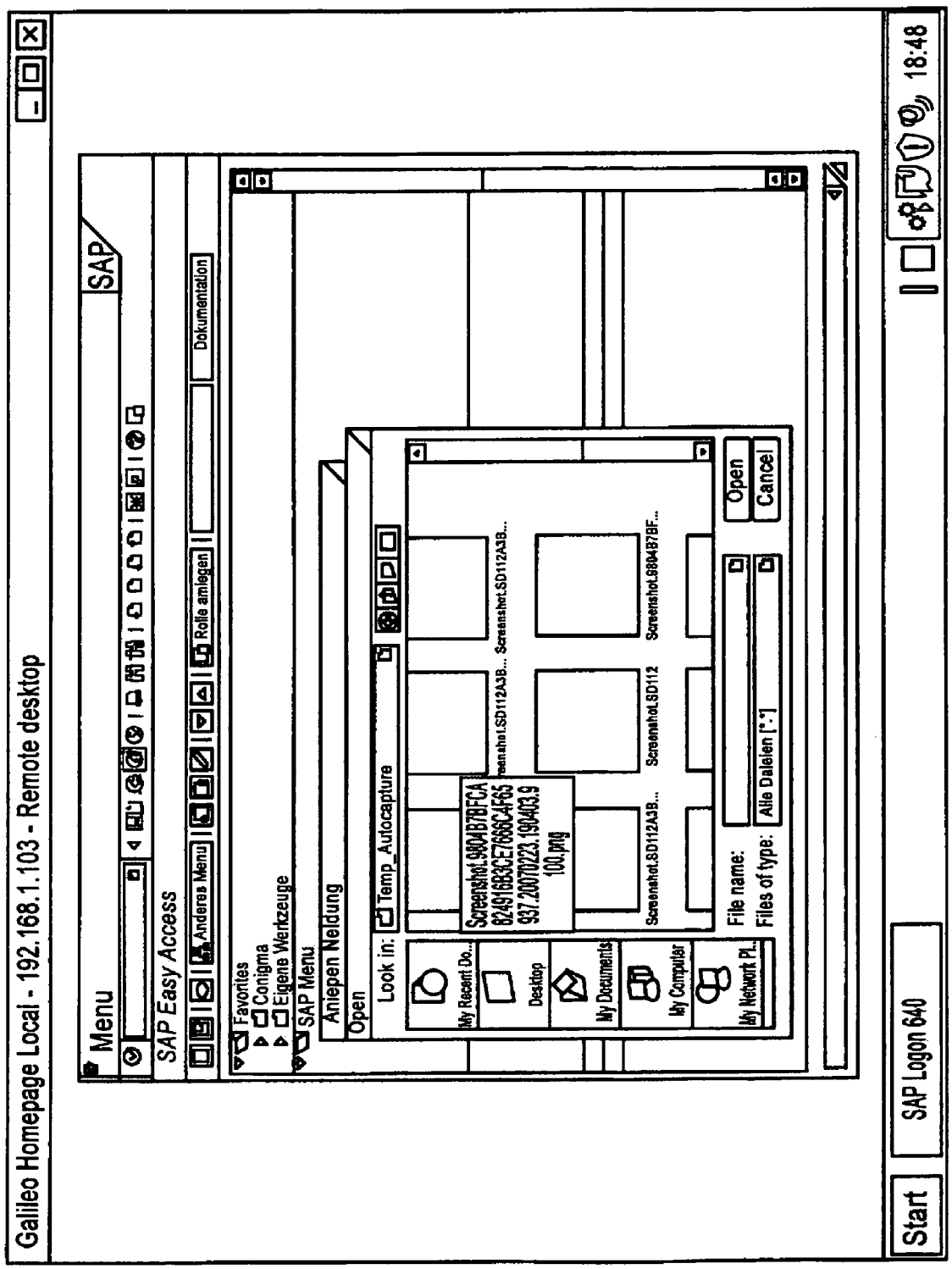
FIG. 15A shows the recorded data in a popup menu having a thumbnail viewing format, showing, for example, each screenshot that may be attached, in accordance with aspects of the present invention.
Figure 15B:
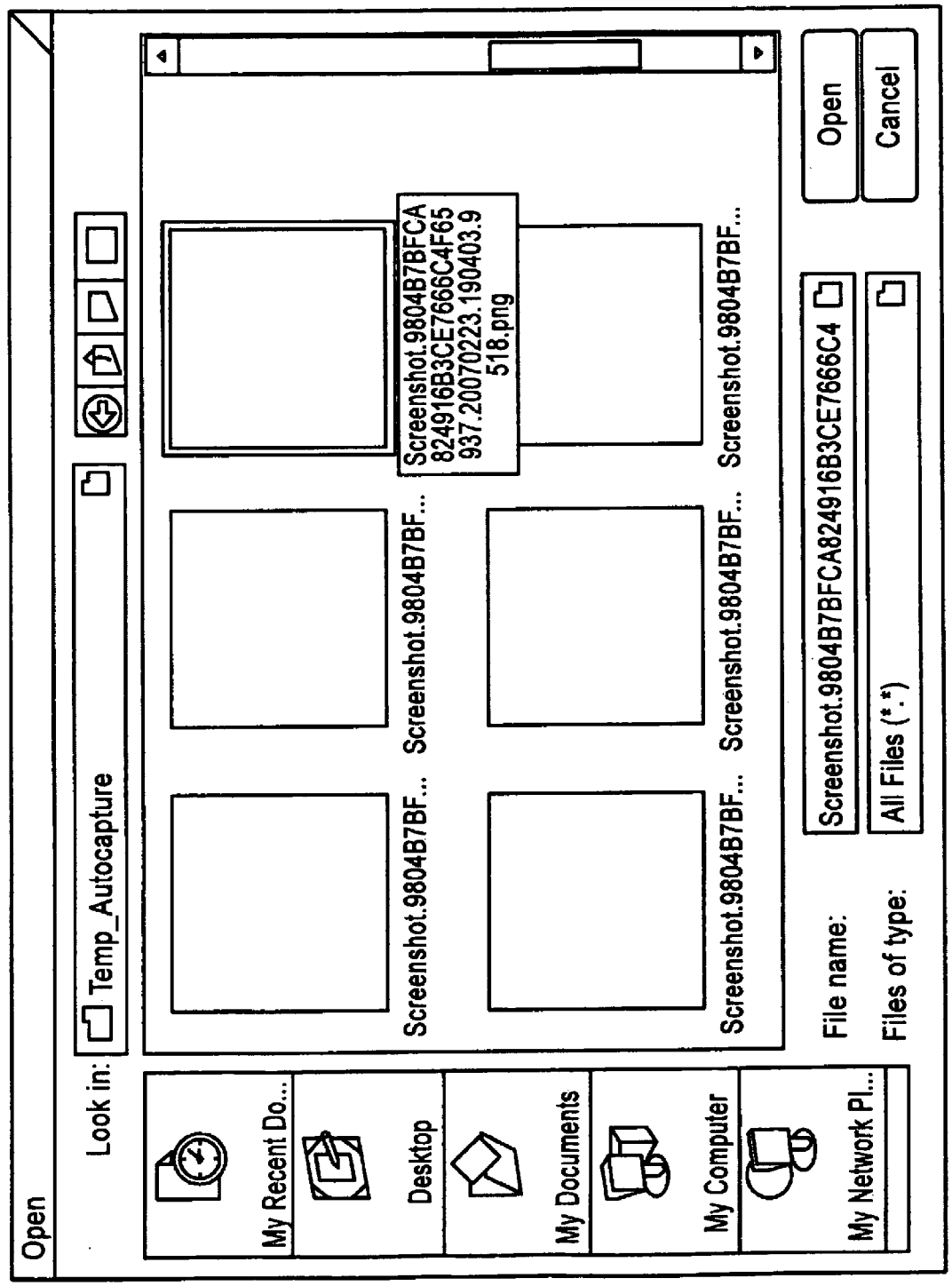
FIG. 15B is an exemplary thumbnail format popup menu, in accordance with aspects of the present invention.
Figure 16:
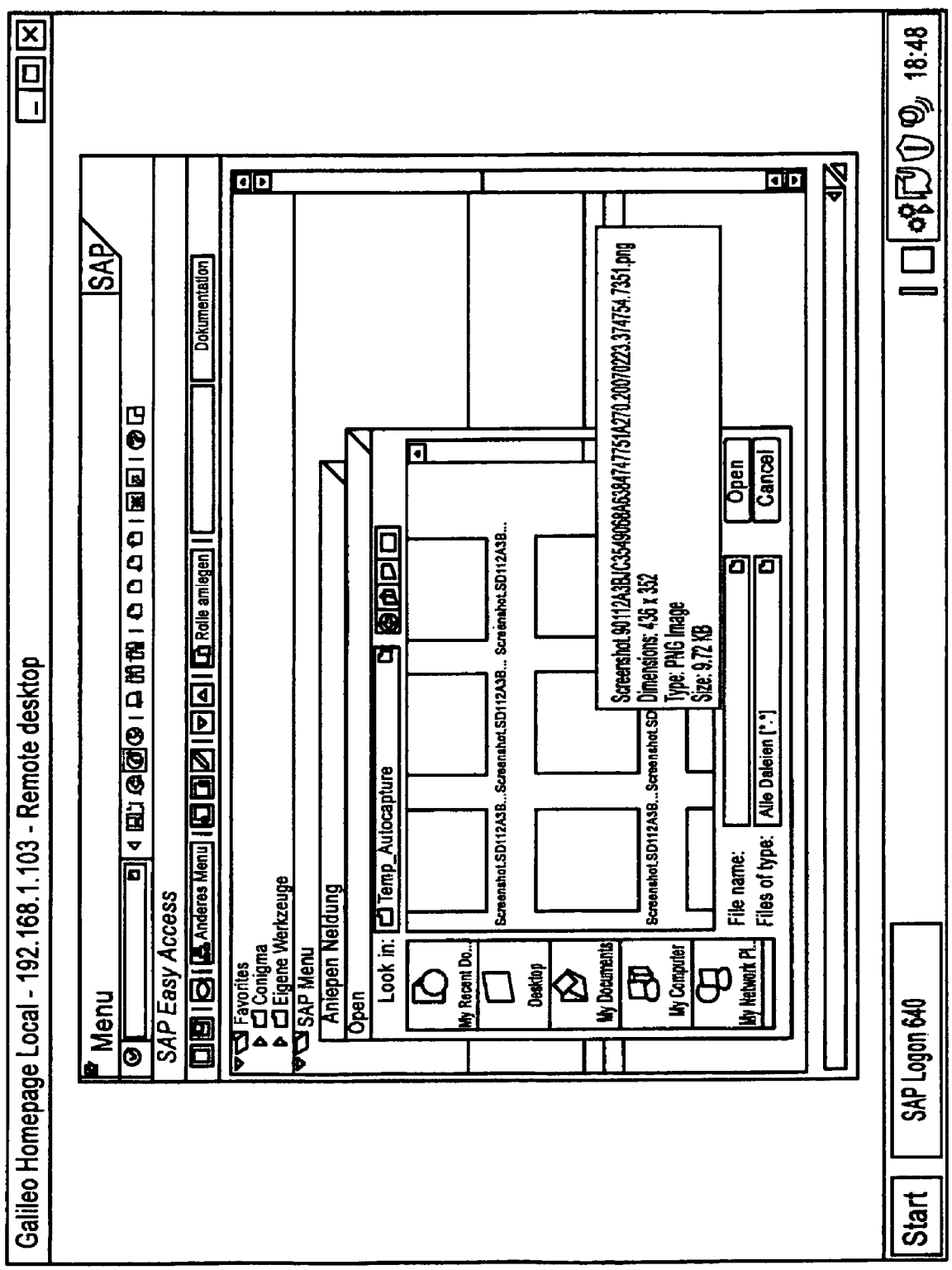
FIG. 16 shows additional stored information relating to a thumbnail data record appearing when the cursor is located over a data item, in accordance with aspects of the present invention.

Also within the reporting popup screen of FIG. 13A, the user is able to select an option to add recorded data (e.g., screen shots) for attachment to the report, as shown in FIG. 13B. As shown in FIG. 14, each screen shot or other data to be added are selected for addition to the report. FIG. 15A shows the recorded data in a popup menu having a "thumbnail" viewing format, showing, for example, each screenshot that may be attached. FIG. 15B is a closeup view of an exemplary thumbnail format popup menu, similar to the popup menu shown in FIG. 15A. FIG. 16 shows additional stored information (e.g., metadata) relating to a thumbnail data record appearing when the cursor is located over a data item.

Figure 12:
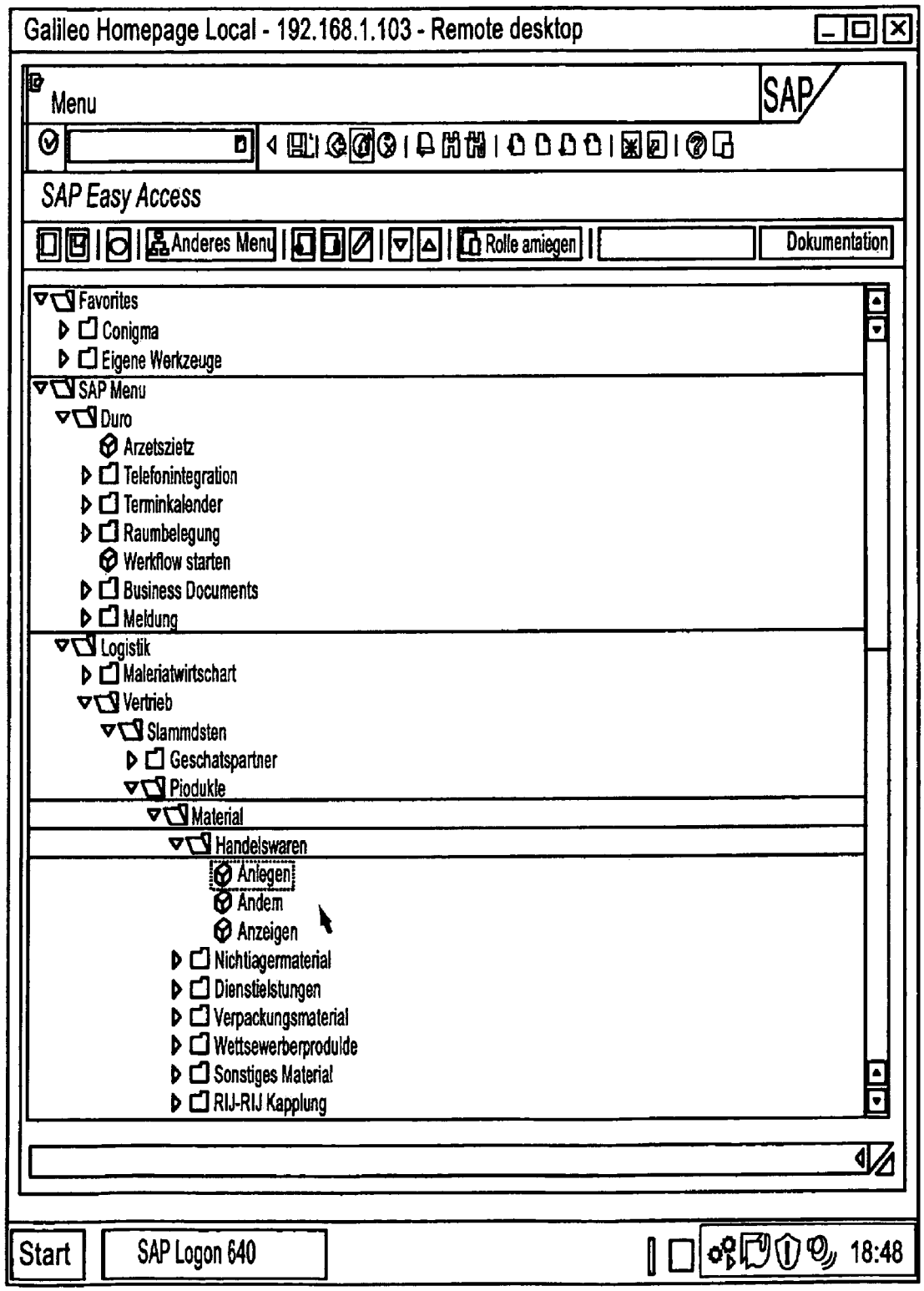
Figure 17:
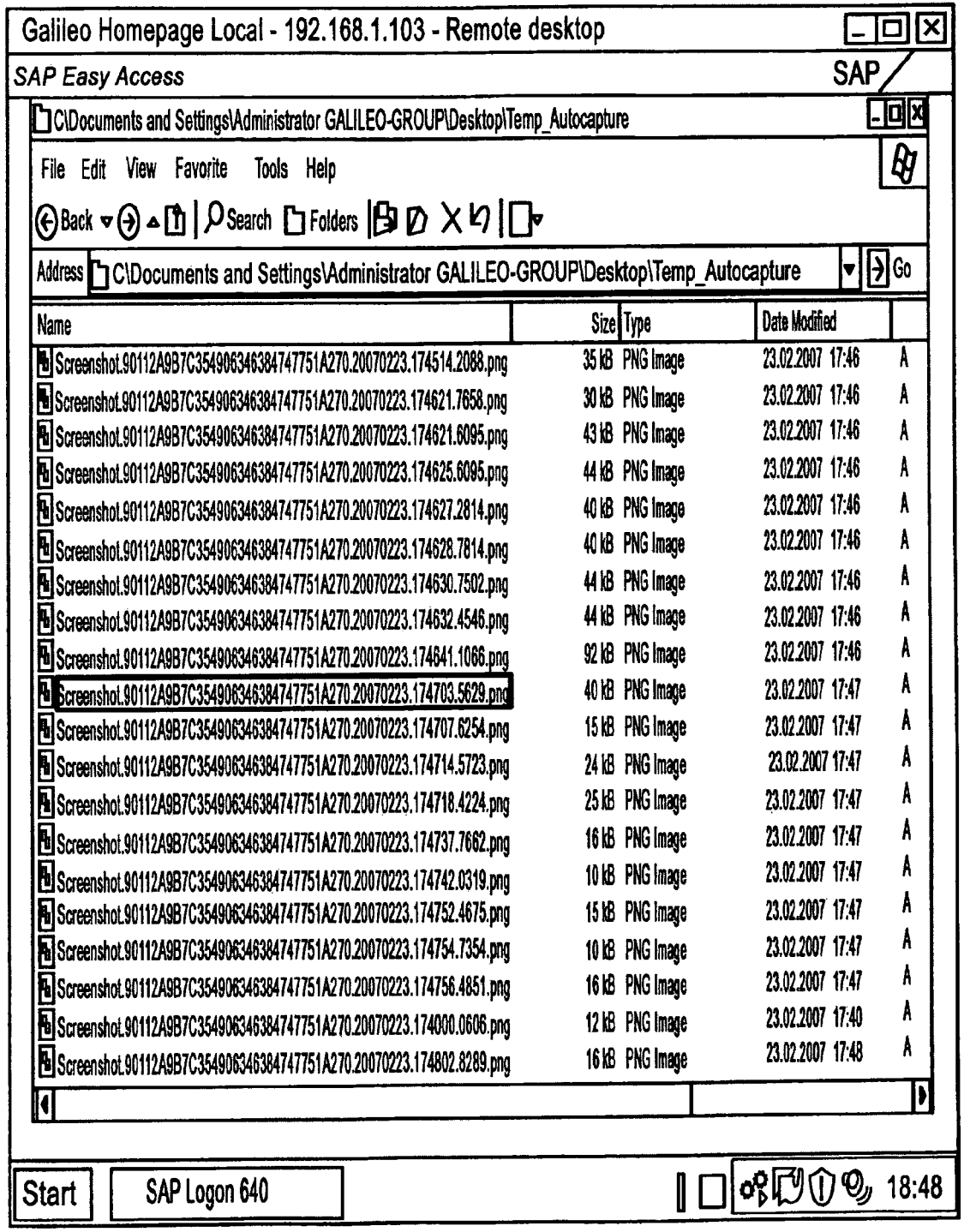
FIG. 17 contains an exemplary screen shot of selection of the data record corresponding to the Graphical User Interface screen of FIG. 12, in accordance with aspects of the present invention.
Figure 18:
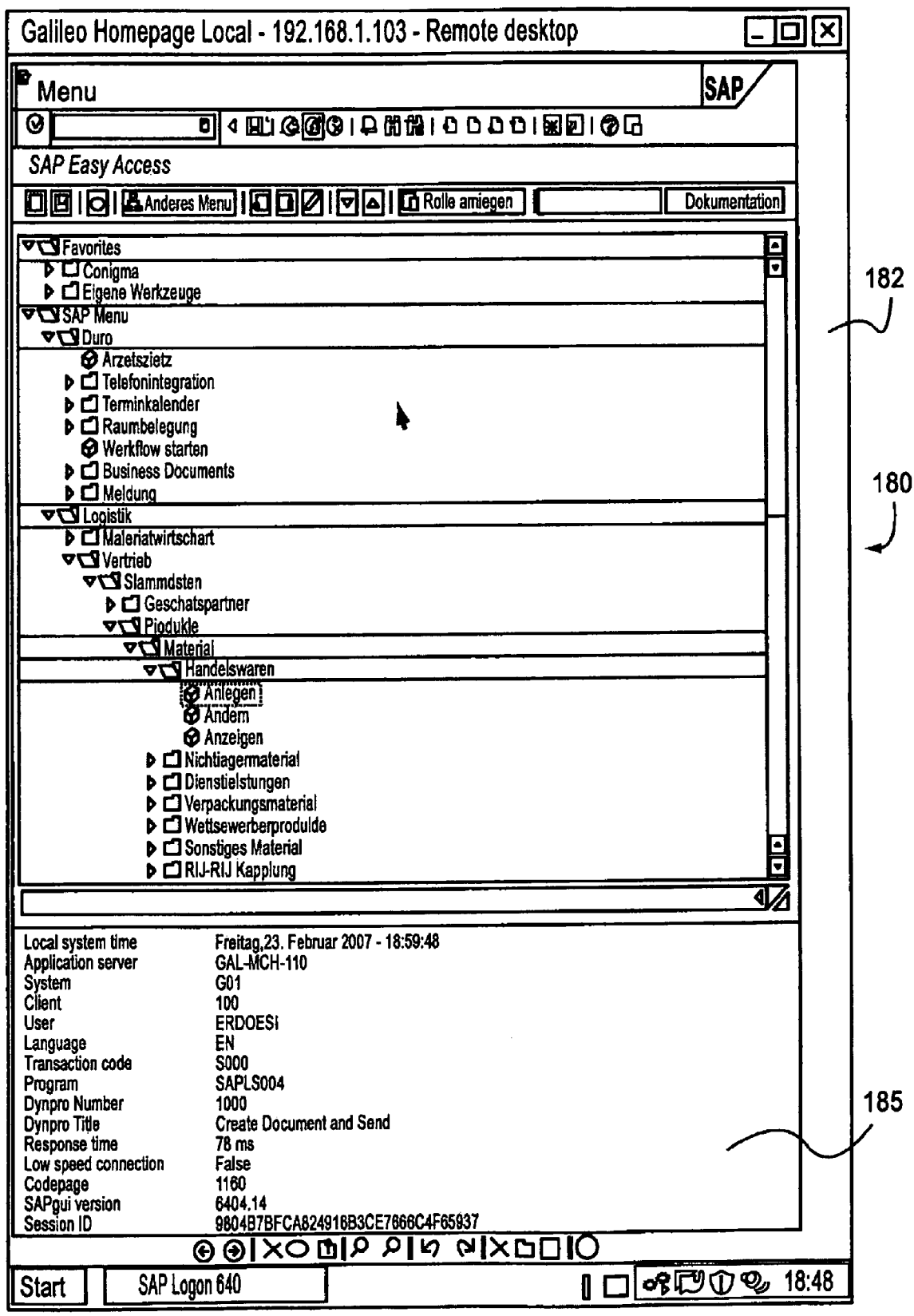
FIG. 18 shows the selected data record of FIG. 17, following selection, which shows a screenshot of the GUI screen of FIG. 12, in accordance with aspects of the present invention.

FIG. 17 contains an exemplary screen shot of selection of the data record corresponding to the GUI screen of FIG. 12. FIG. 18 shows the selected data record of FIG. 17, following selection, which shows a screenshot of the GUI screen of FIG. 12. Shown within the GUI screen 180 of FIG. 18 is the screen shot 182 for the GUI screen of FIG. 12 and also selected metadata 185 relating to the GUI screen of FIG. 12. The metadata 185 may include, for example, a record of the time when the GUI screen was captured, the application server on which the action relating to the GUI screen occurred, the client, the user, and the language involved, whether the user was logged on, the transaction to which any action related, the active program involved, and the active screen involved.

Recorded metadata relating to an event, such as the metadata 185 of FIG. 18, may be recorded in an easily transmitted and analyzed form, such as binary data. Among other things, this data may be used to assist in evaluating sets of data in order to determine the likely causes of an event (e.g., a software error).

In one variation of the present invention, screen shots and/or other information recorded in accordance with operation are selectively recordable based on certain inputted parameters. For example, in one variation, the screen shots and/or other information is recorded on a preset periodic basis (e.g., every minute). In some variations, the period for recording may be set by the user. In other variations, the screen shots and/or other information is recorded based on an event occurring (e.g., each user action; moving from one GUI screen to the next; software processing steps).

Figure 19A:
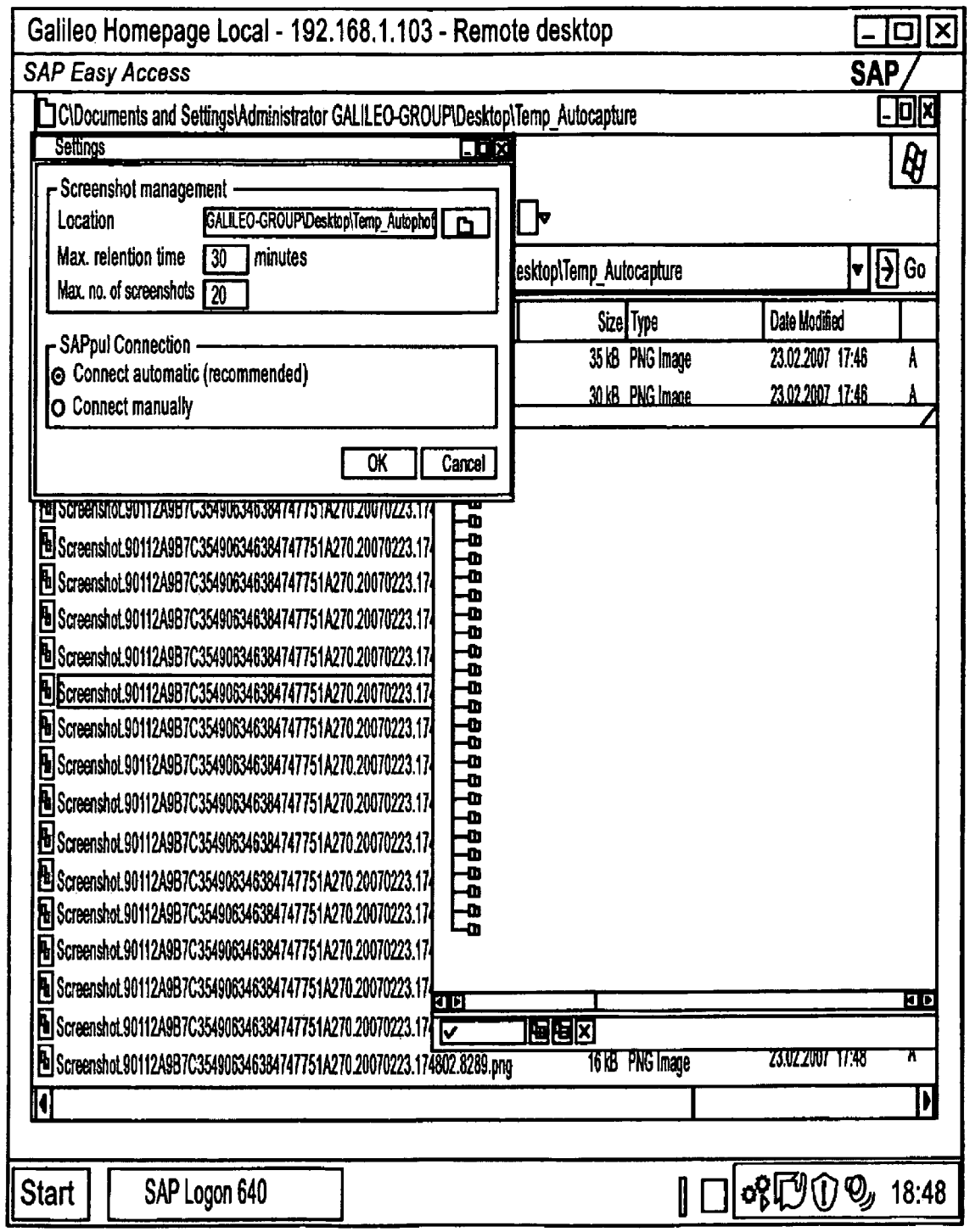
FIG. 19A shows a settings popup menu within a web browser, containing various features selectable by the user, which include retention time, maximum number of saved screen shots, and storage location for stored screen shots, in accordance with aspects of the present invention.
Figure 19B:
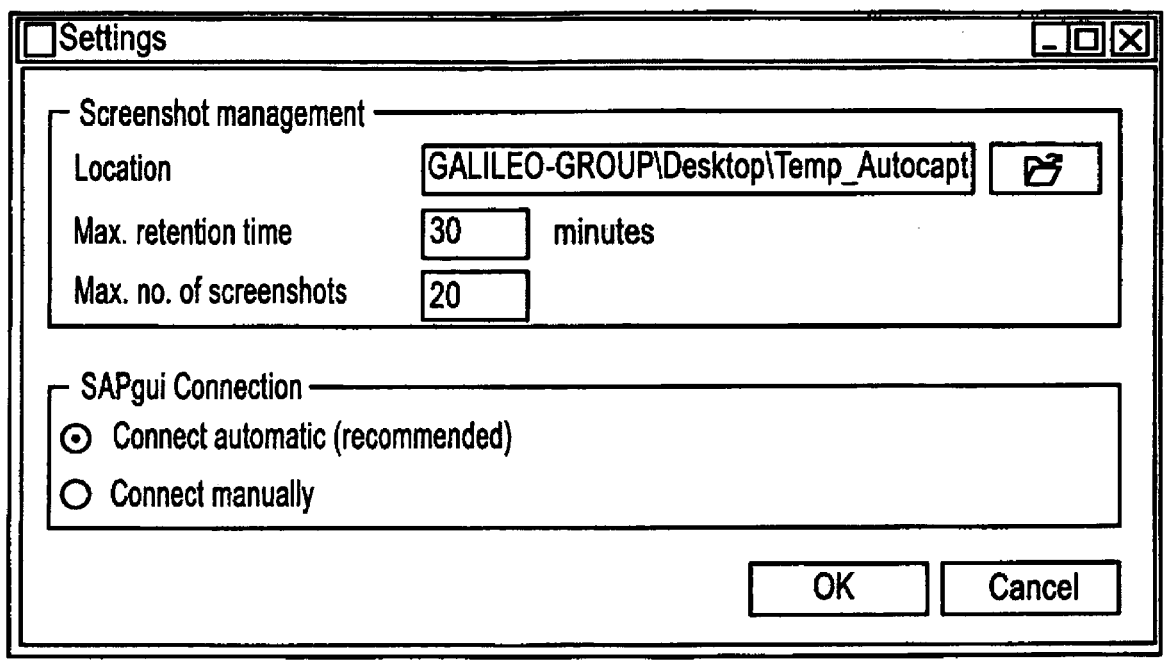
FIG. 19B is a close-up view of the popup menu of FIG. 19A.

In addition to setting when and how the screen shots and/or other information are recorded, the size of the buffer or other storage mechanism and other parameters may be selectively determined (e.g., time or number of files for purging the stored information). For example, FIG. 19A shows a settings popup menu within a web browser, containing various features selectable by the user, which include retention time, maximum number of saved screen shots, and storage location for stored screen shots. FIG. 19B is a closeup view of the popup menu of FIG. 19A.

Figure 20:
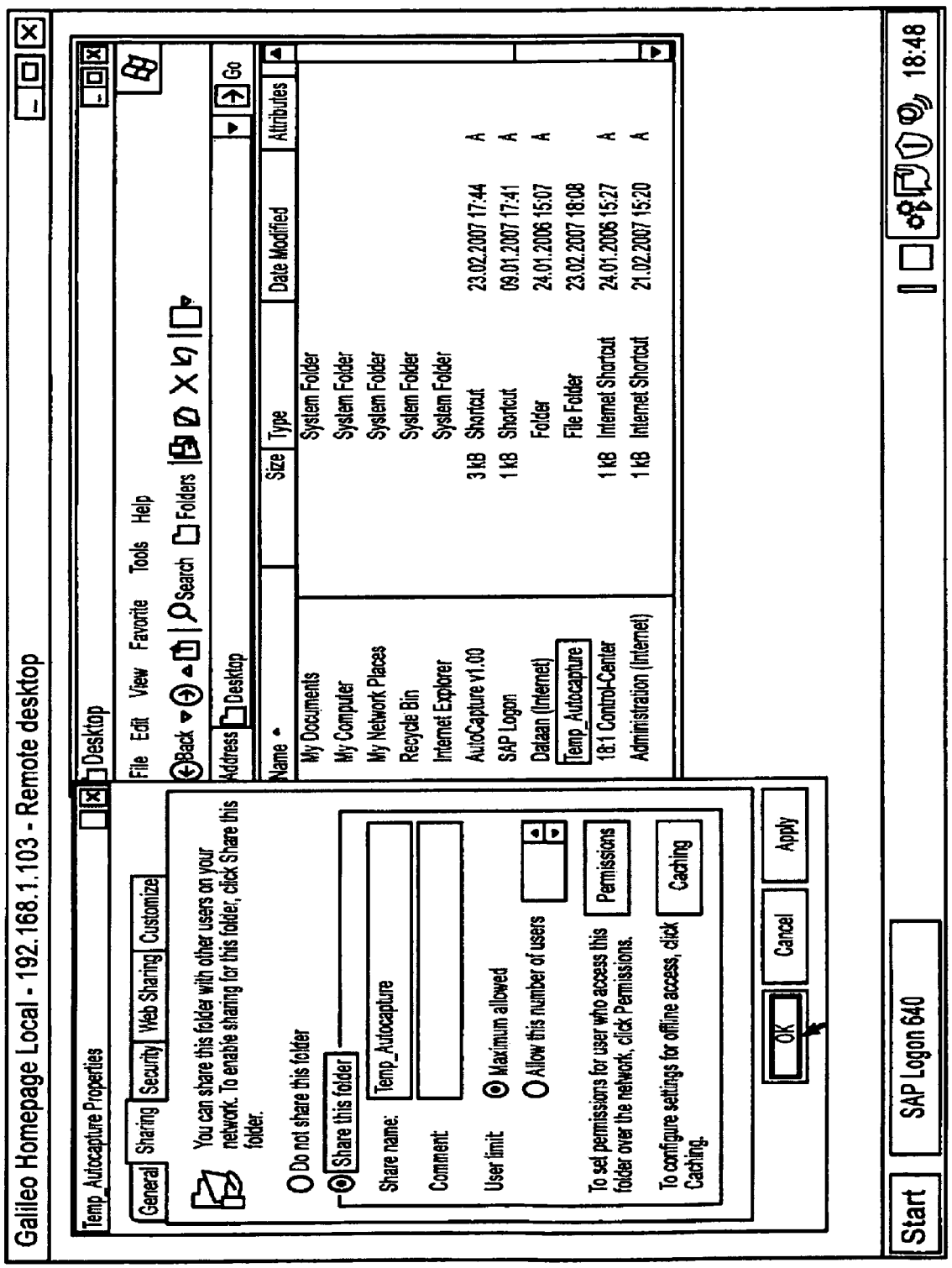
FIG. 20 shows an exemplary permission popup menu for controlling access to selected file information, in accordance with one exemplary variation of the present invention.

In some variations, access may be controlled to the screen shots and/or other information recorded, such as through use of permission features. FIG. 20 shows an exemplary permission popup menu for controlling access to selected file information, in accordance with aspects of the present invention.

In variations of the present invention, screen shots and/or other information recorded in accordance with operation may be transmitted to a remote location for analysis. For example, in the exemplary variations involving SAP software shown in FIGS. 1A-18, the SAP software includes an error reporting function that may be used, for example, by a remote support service to determine and respond to such events (e.g., identifying and addressing errors).

In variations of the present invention, the likely source of error or other event can be determined using analytical tools relating to the error or other event. For example, the screen shots and/or other information recorded may be prioritized based on likelihood of causing the event (e.g., error). Example criteria for use for such prioritization purposes are discussed further below.

An example of application of likelihood factors in an illustrative user interaction will now be described. In this illustrative interaction, multiple SAP user sessions are open simultaneously. The metadata tracks each session and each transaction within each session. In addition, the context of each transaction is tracked. For example, a transaction is processed that requires sales order information from a customer, the sales order information is entered, a delivery note for the sales order is then created, and an error then occurs. In this case, the screen shot for the delivery note is likely important in evaluating the error, and the screen shot for creating the sales order is not likely to be important, since the error did not occur after the sales order input is completed, but did occur after the delivery note creation.

In one variation, in addition to the user selection options shown in the popup window of FIGS. 3A and 3B, the user has an option to prioritize the screens shots and/or other information recorded using a selectable analysis tool. This function may also be performed remotely by an analyst. In some variations, the performance of this function is limited to user control so as, among other things, to allow the user to assure confidentiality of the data recorded.

In one variation of the present invention, the software for operating the screen shot and other data capture and recording is housed at each user's terminal (e.g., PC; handheld device, such as personal data assistant; telephone device). Also, optionally located at the user's computer is software for analyzing the screen shot and other data captured (e.g., software for determining likely screen shots of use in error determination). The software may also be operated from a remote site, such as via use of a network (e.g., the Internet).

In accordance with aspects of the present invention, the screen shot and other data captured are recorded within one or more data repositories contained within or accessible by the user's terminal. For example, the repository may be housed within a PC or accessible by the PC via a network, such as the Internet.

Among other advantages, the use of a locally accessible data repository allows the user to easily maintain data security and minimizes use of resources (e.g., minimizes data that must be transmitted to and from the user terminal, thereby reducing processing speed and other resource use at the user terminal). For example, the user, prior to transmitting the event report, may sanitize the report by removing confidential data.

Figure 21:
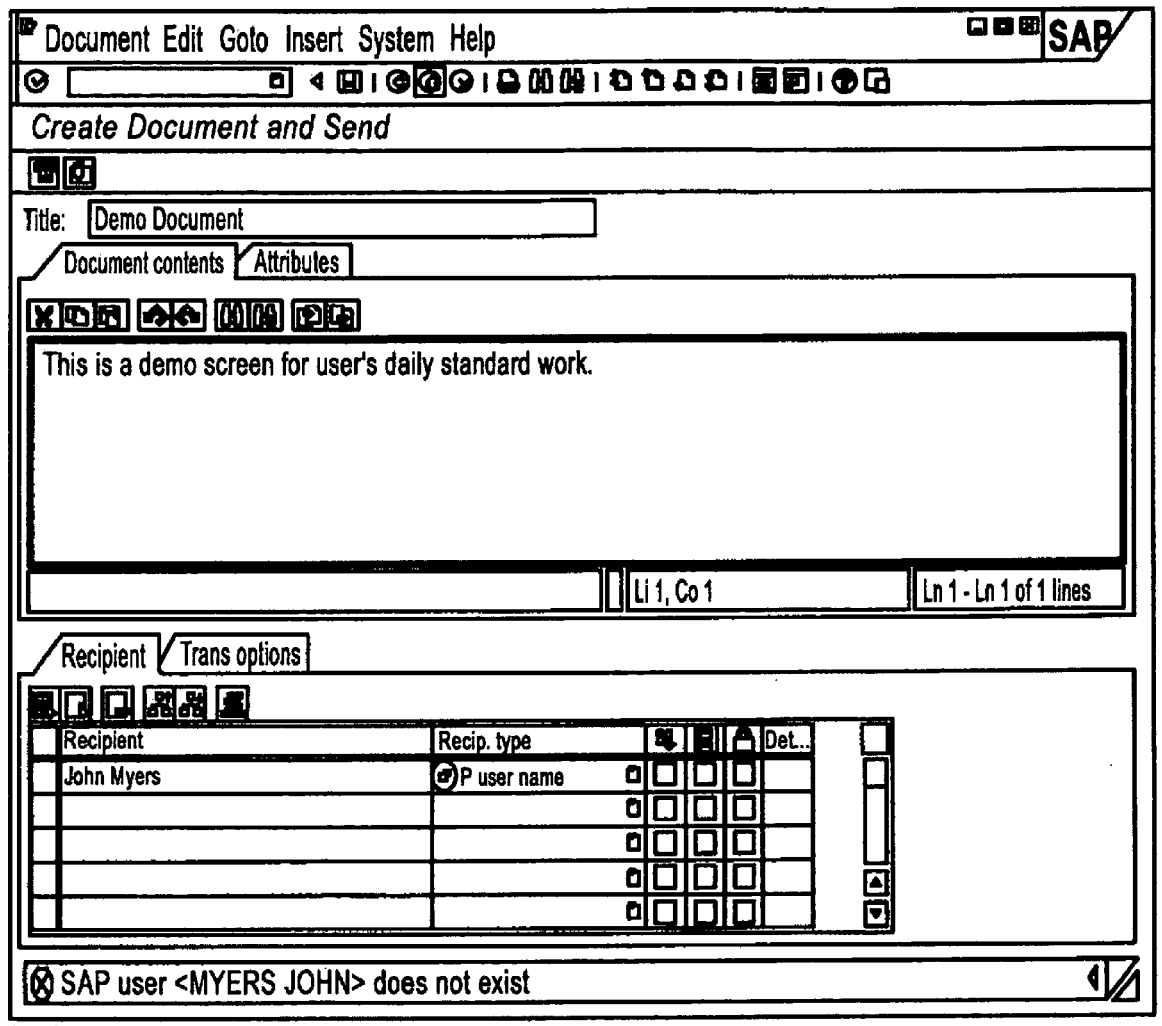
FIG. 21 presents another exemplary reporting format, including exemplary metadata for recording a software operation event, in accordance with another variation of the present invention.

FIG. 21 presents another exemplary reporting format, including exemplary metadata for recording a software operation event, in accordance with aspects of the present invention.

Figure 22:
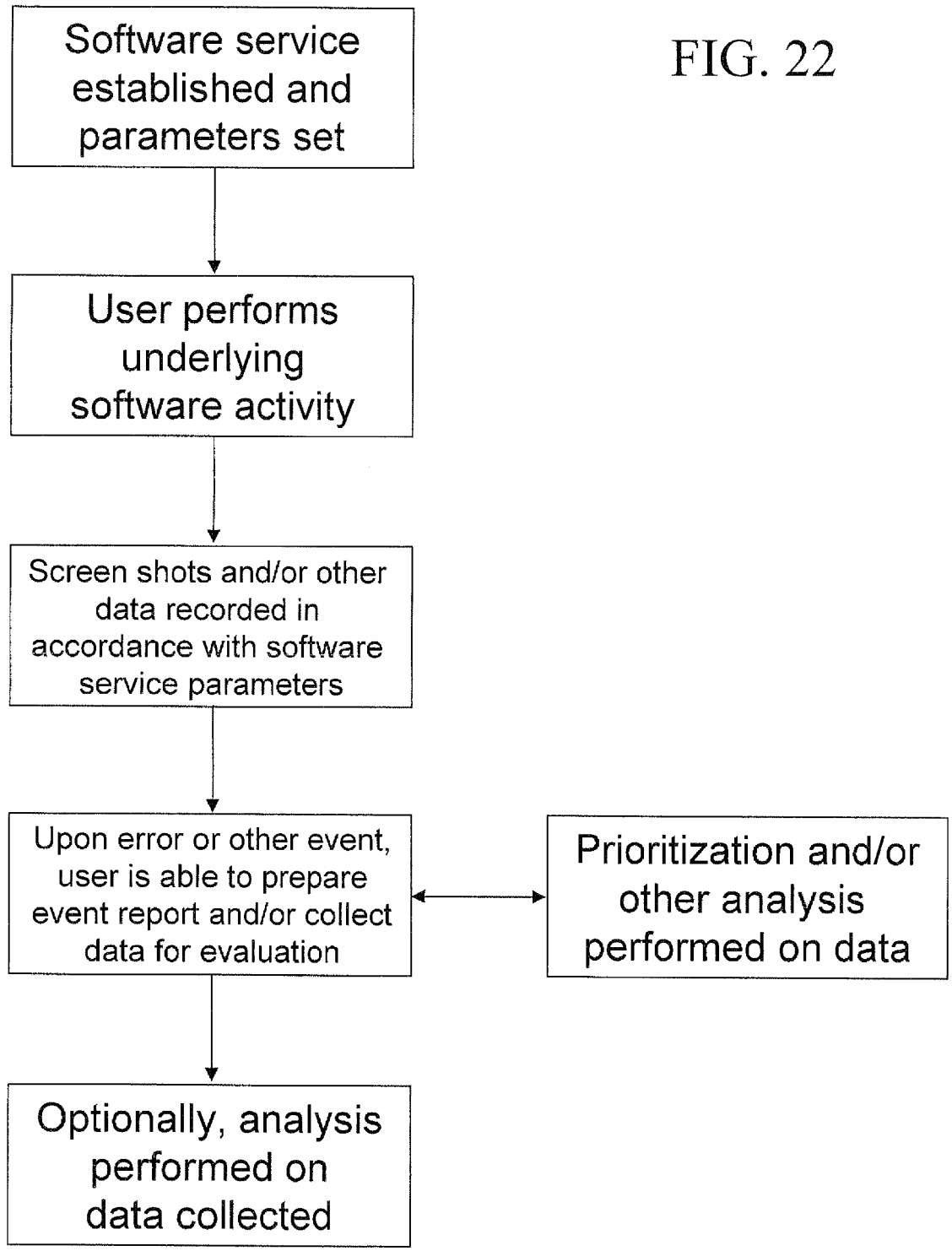
FIG. 22 is an exemplary flowchart of functions performable in accordance with aspects of the present invention.

FIG. 22 is an exemplary flowchart of functions performable in accordance with aspects of the present invention. As shown in FIG. 22, the software service is first enabled and parameters are set. The user and underlying software then perform various software related functions. Screen shots and/or other data are recorded in accordance with the software service parameters.

As further shown in FIG. 22, upon an error or other event occurring, the user is able to prepare an event report and/or collect screen shots and/or other data for evaluation. Optionally, prioritization and/or other analysis may be performed on the screen shots and/or other data. Then, optionally, analysis may be performed on the data collected, such as to analyze the cause of a software error.

Figure 23:
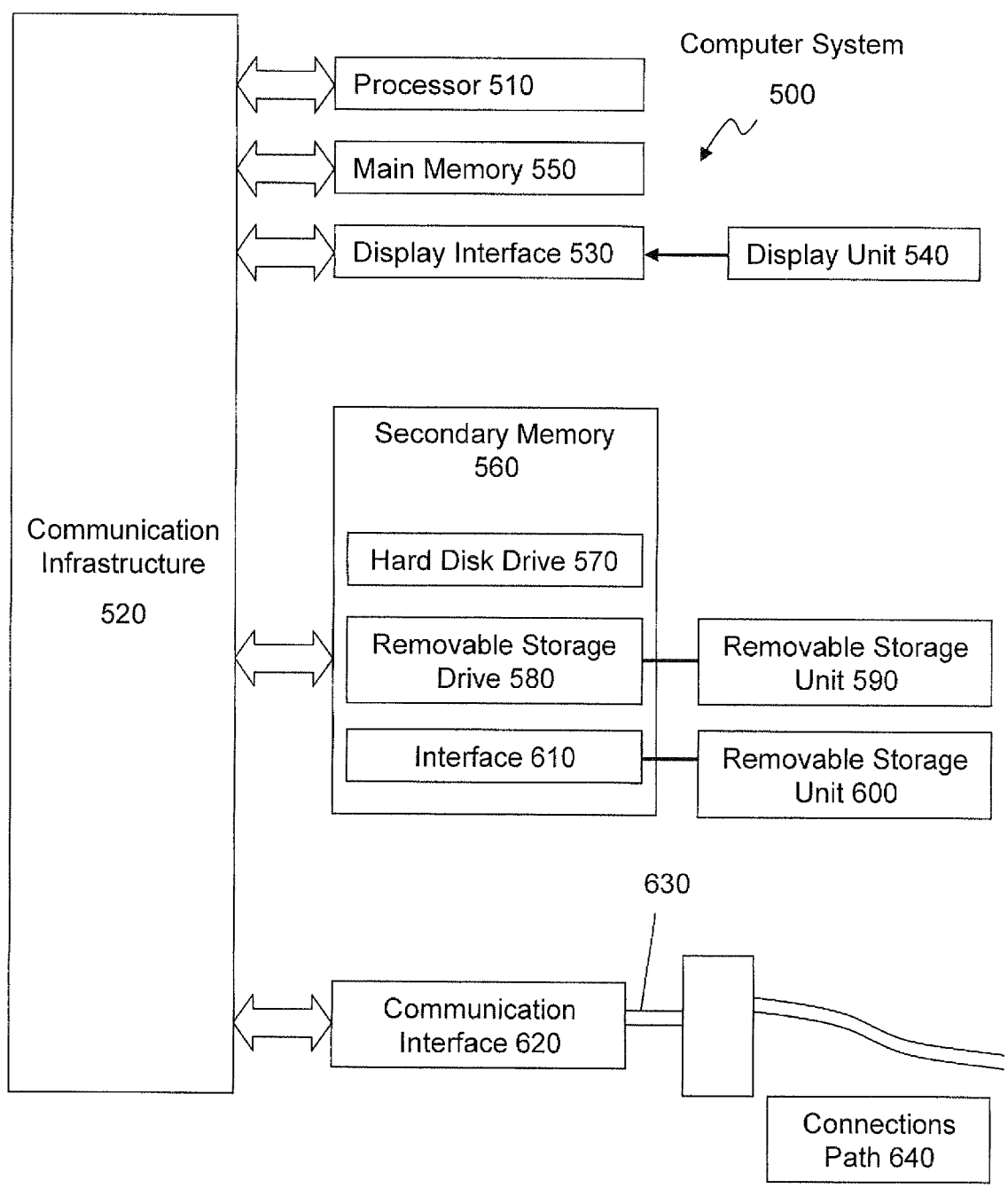
FIG. 23 illustrates an exemplary computer system usable with various features of some variations of the present invention.

Aspects of the present invention may be implemented using hardware, software or a combination thereof and may be implemented in one or more computer systems or other processing systems. In one variation, the invention is directed toward one or more computer systems capable of carrying out the functionality described herein. An example of such a computer system 500 is shown in FIG. 23.

Computer system 500 includes one or more processors, such as processor 504. The processor 504 is connected to a communication infrastructure 506 (e.g., a communications bus, cross-over bar, or network). Various software implementations are described in terms of this exemplary computer system. After reading this description, it will become apparent to a person skilled in the relevant art(s) how to implement the invention using other computer systems and/or architectures.

Computer system 500 can include a display interface 502 that forwards graphics, text, and other data from the communication infrastructure 506 (or from a frame buffer not shown) for display on the display unit 530. Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc., which is read by and written to removable storage drive 514. As will be appreciated, the removable storage unit 518 includes a computer usable storage medium having stored therein computer software and/or data.

In alternative variations, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528, which may be electronic, electromagnetic, optical or other signals capable of being received by communications interface 524. These signals 528 are provided to communications interface 524 via a communications path (e.g., channel) 526. This path 526 carries signals 528 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 514, a hard disk installed in hard disk drive 512, and signals 528. These computer program products provide software to the computer system 500. Aspects of the present invention are directed to such computer program products.

Computer programs (also referred to as computer control logic) are stored in main memory 508 and/or secondary memory 510. Computer programs may also be received via communications interface 524. Such computer programs, when executed, enable the computer system 500 to perform the features in accordance with aspects of the present invention, as discussed herein. In particular, the computer programs, when executed, enable the processor 504 to perform the features of the present invention. Accordingly, such computer programs represent controllers of the computer system 500.

In one variation of the present invention implemented using software, the software may be stored in a computer program product and loaded into computer system 500 using removable storage drive 514, hard drive 512, or communications interface 524. The control logic (software), when executed by the processor 504, causes the processor 504 to perform the functions as described herein. Another variation is implemented primarily in hardware using, for example, hardware components, such as application specific integrated circuits (ASICs). Implementation of the hardware state machine so as to perform the functions described herein will be apparent to persons skilled in the relevant art(s).

Figure 6:
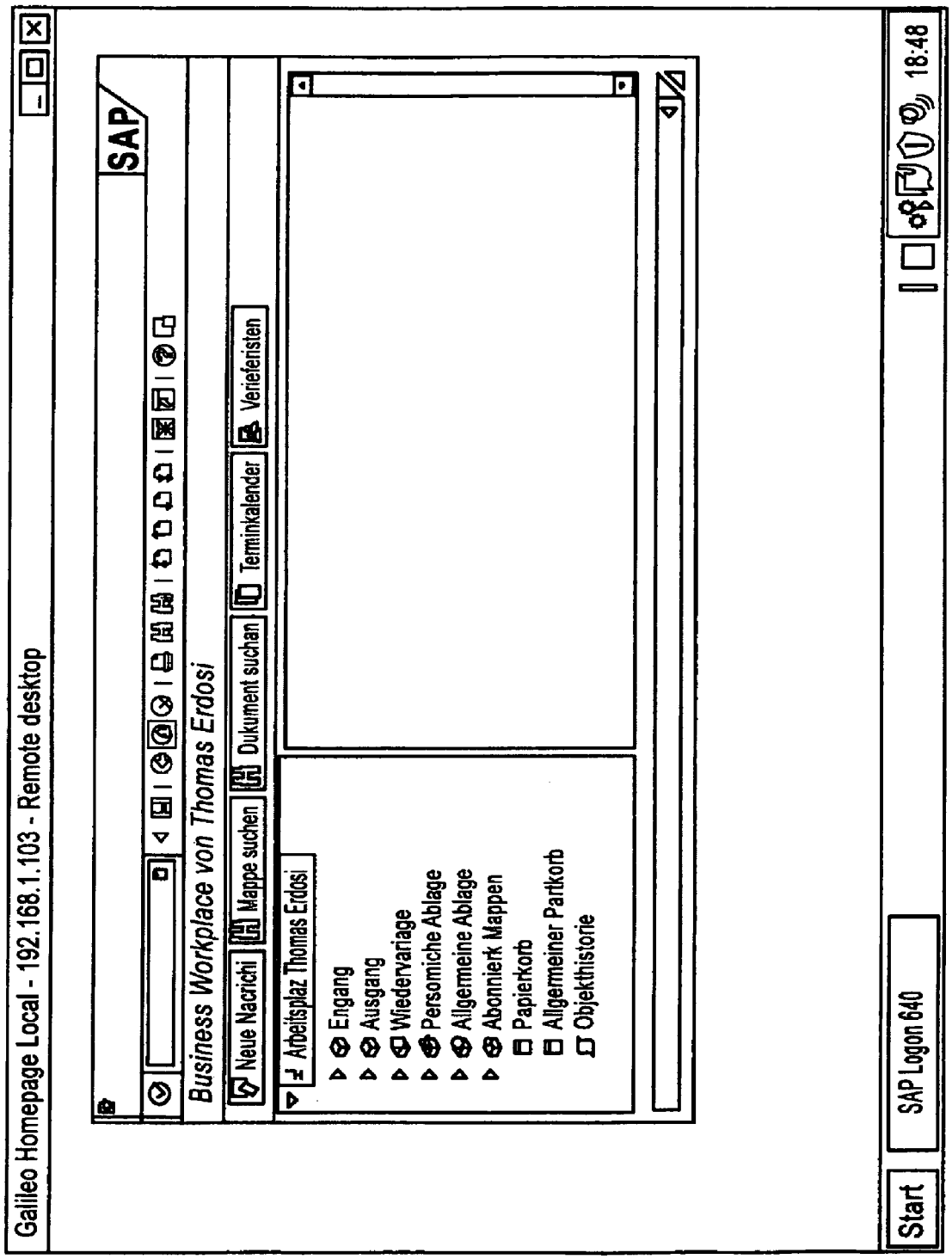
Figure 7:
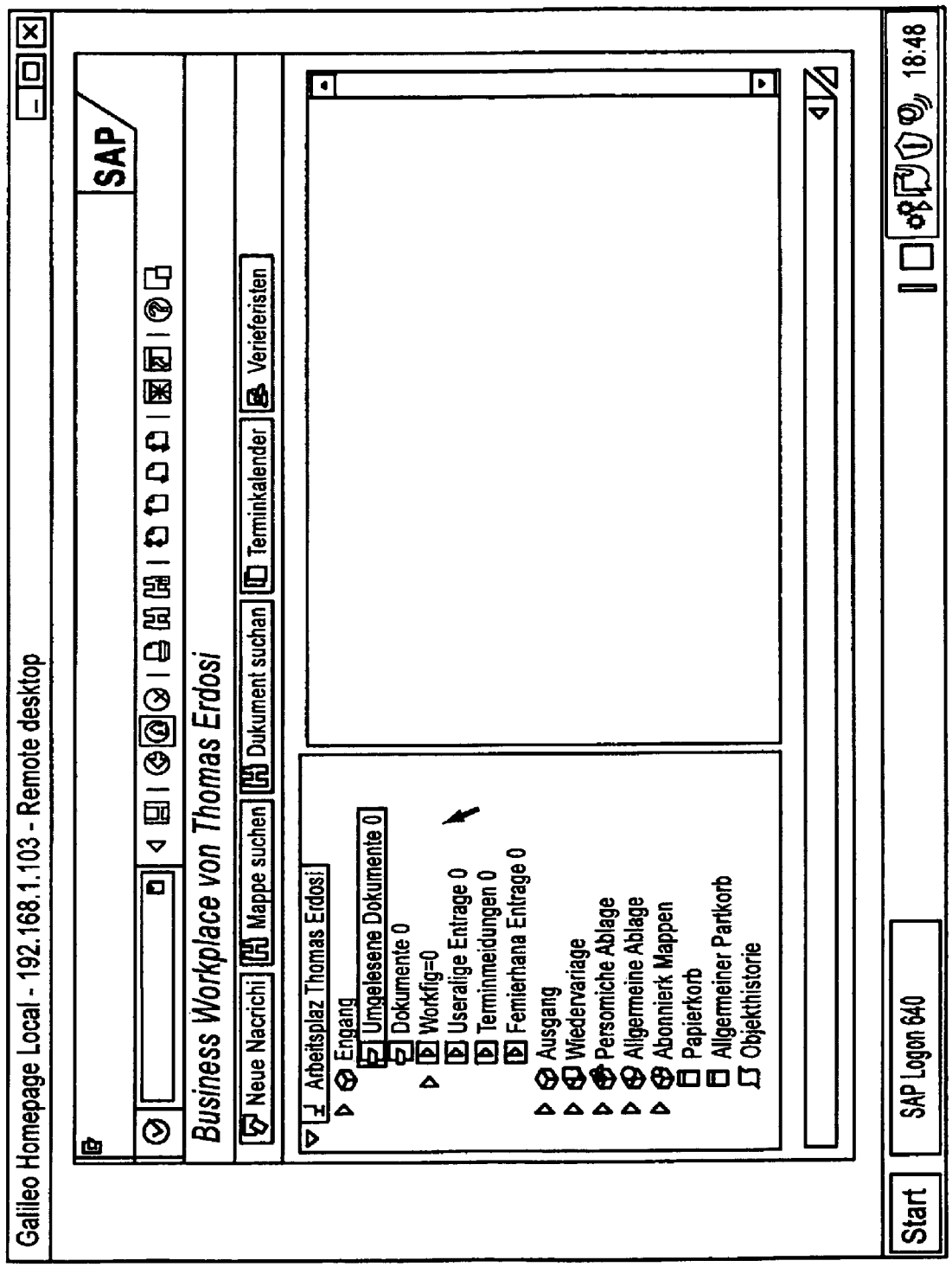
Figure 8:
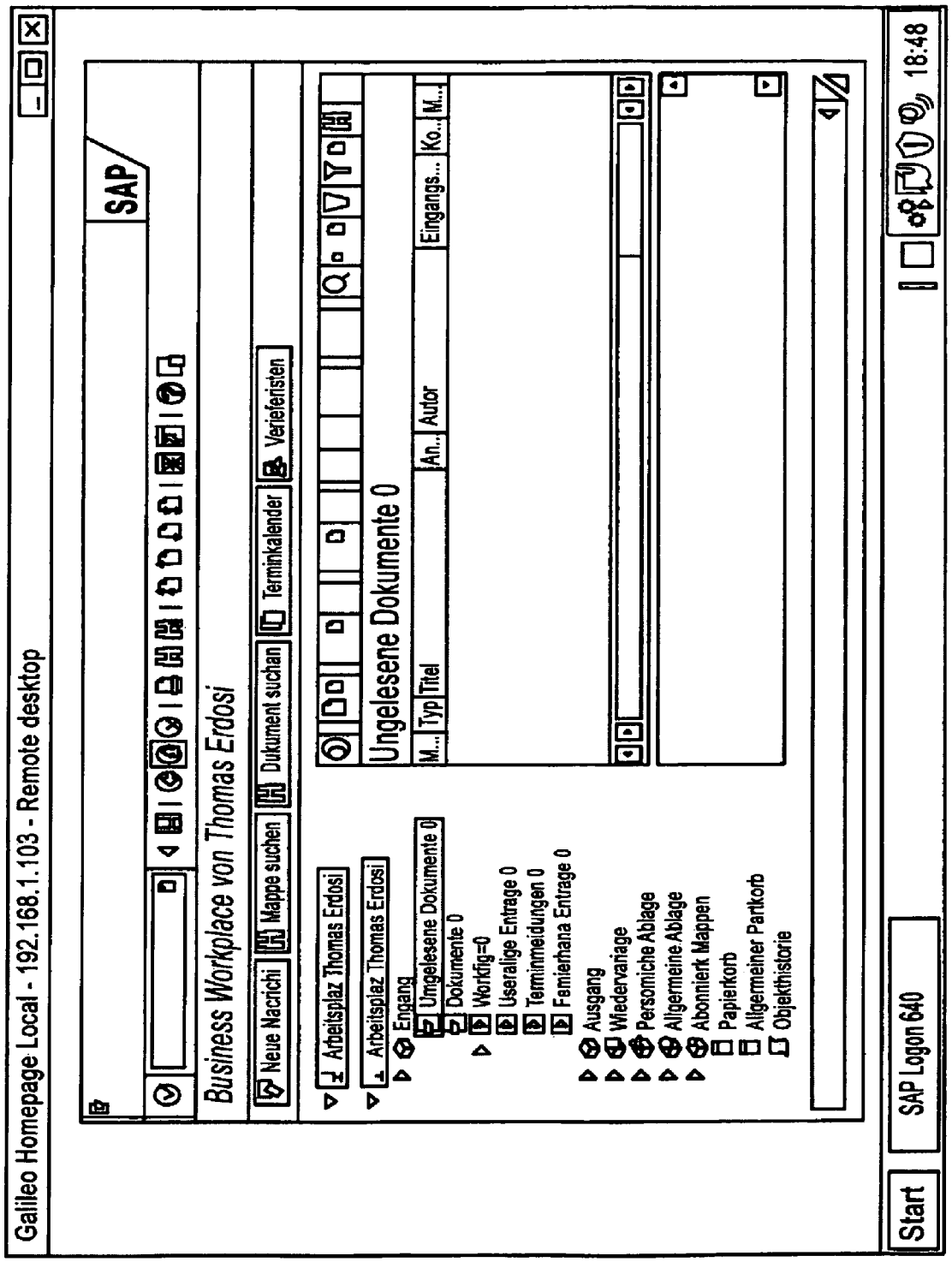
Figure 9:
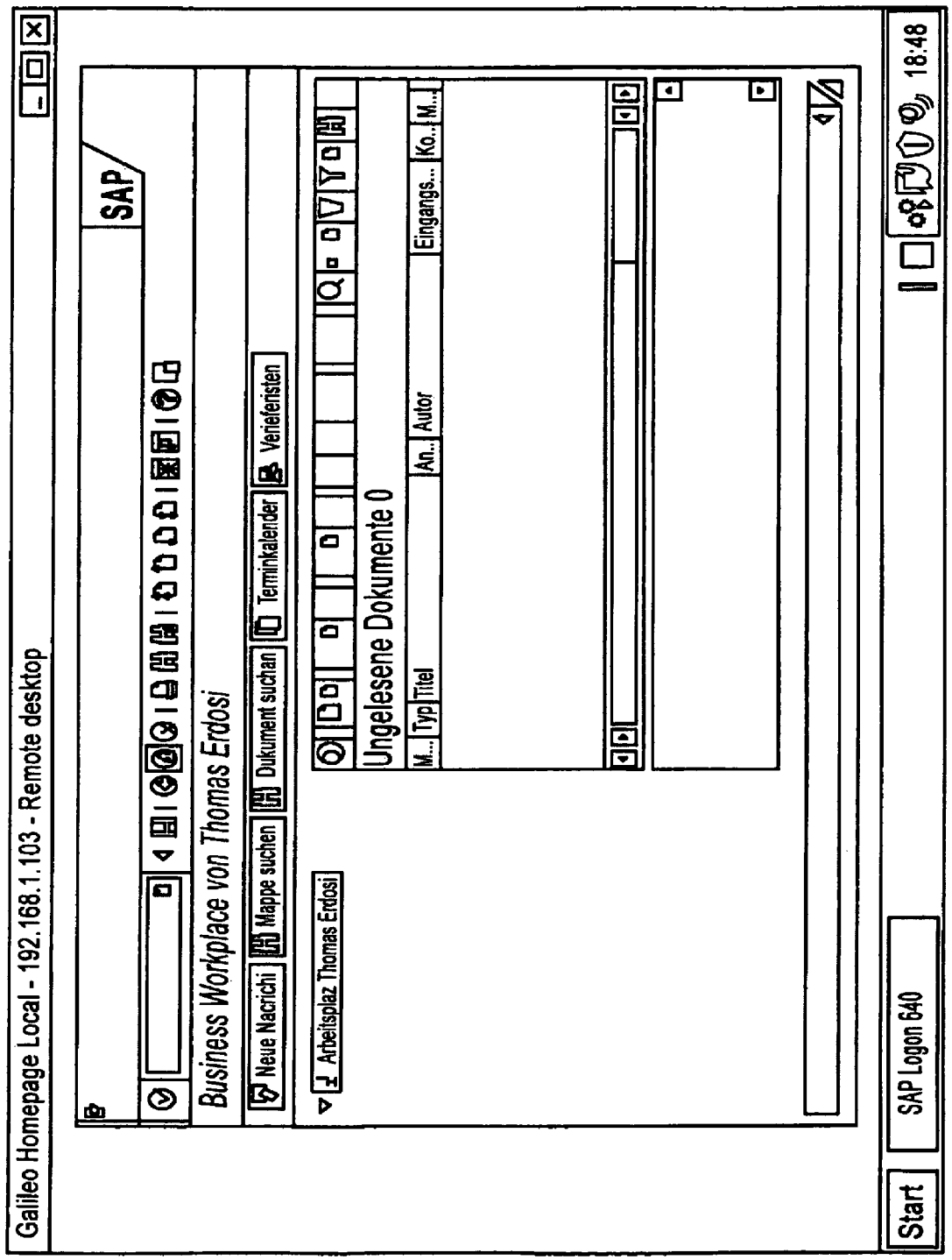
Figure 10:
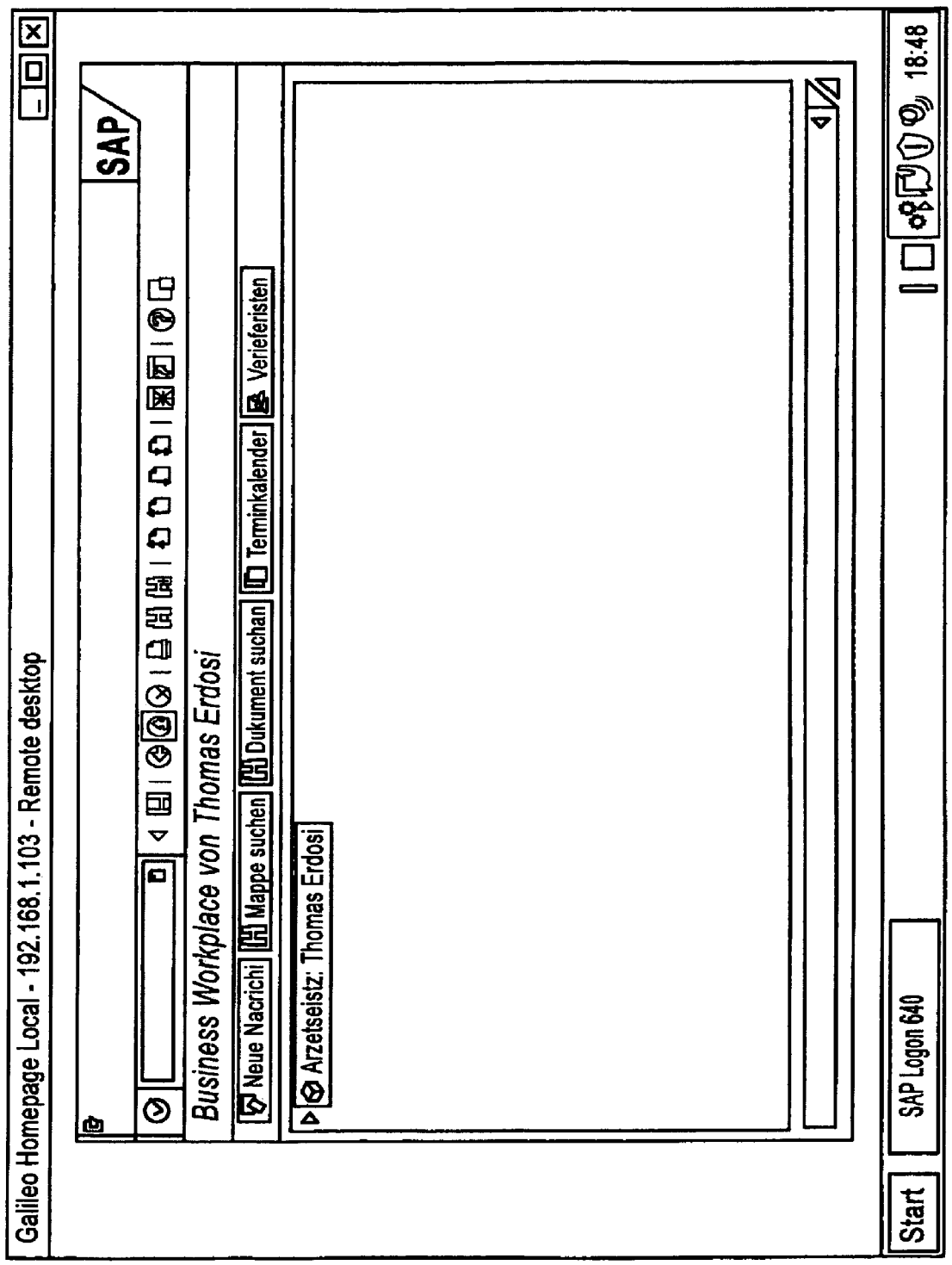
Figure 11:
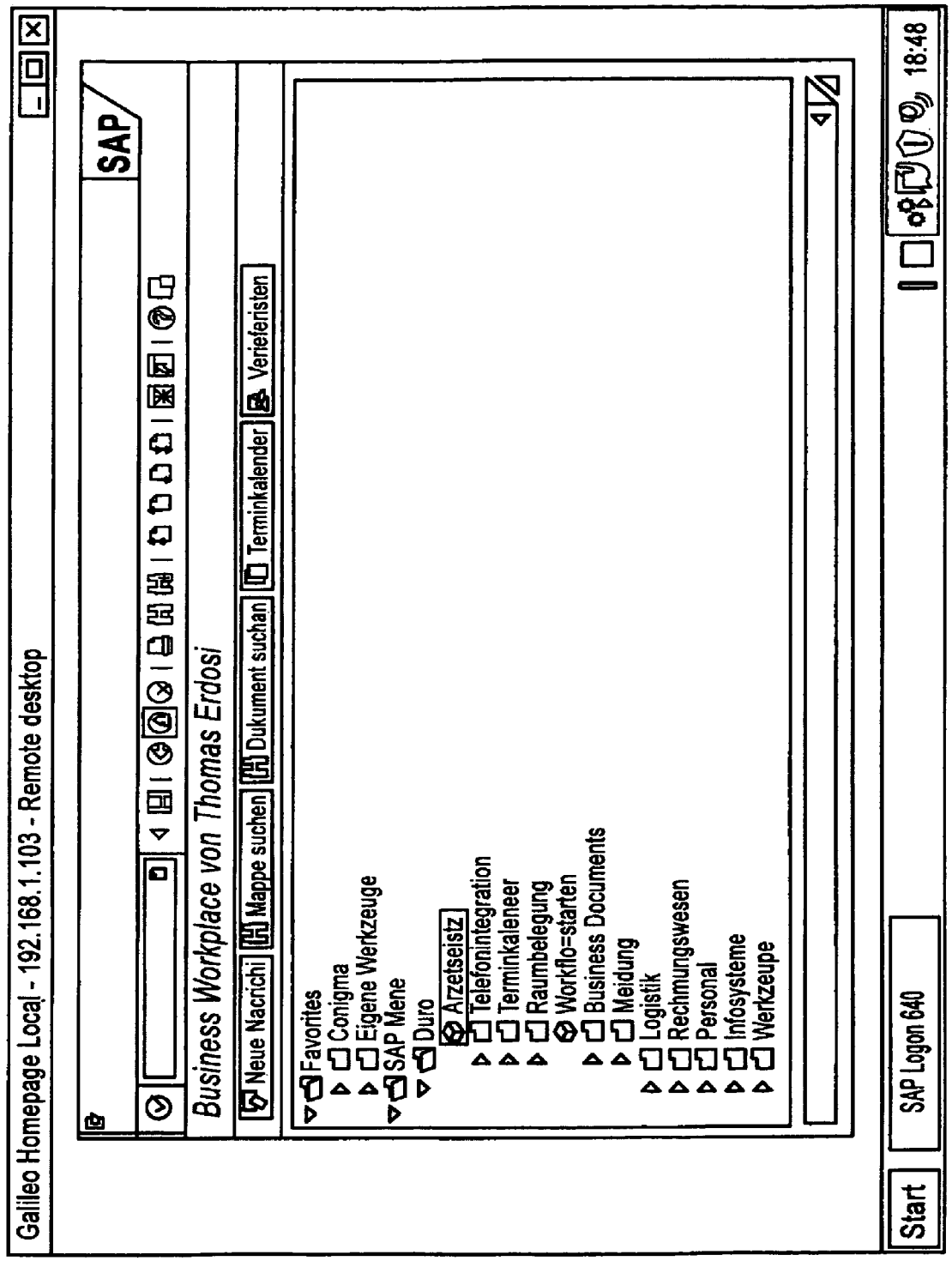
Figure 24:
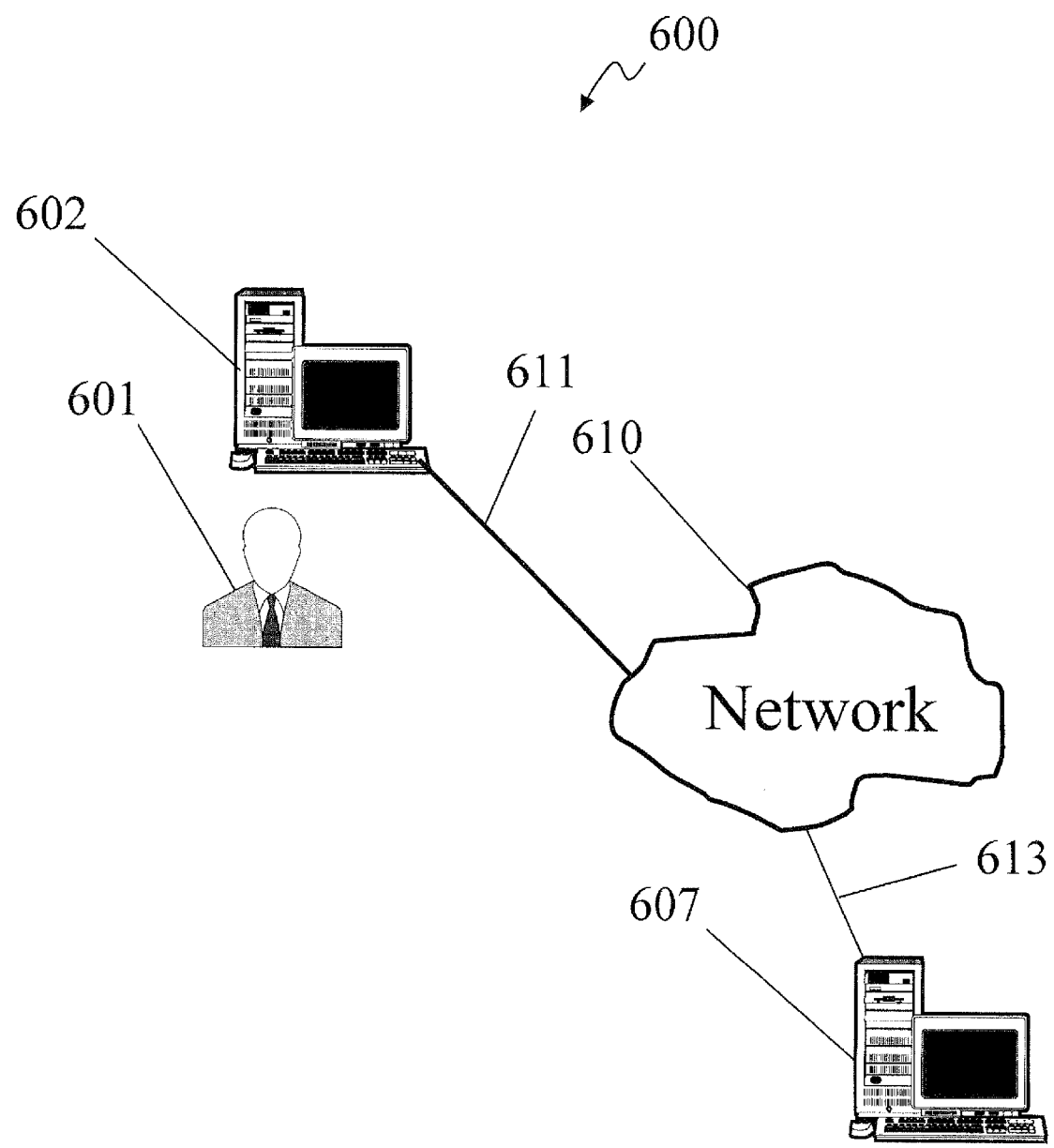
FIG. 24 shows various features of an example computer system for use in conjunction with collecting, transmitting, receiving, processing, and otherwise using information communicated with the software service of an illustrative variation of the present invention.

FIG. 24 shows various features of an example computer system 600 for use in conjunction with collecting, transmitting, receiving, processing, and otherwise using information communicated with the software service in accordance with aspects of the present invention. As shown in FIG. 6, the computer system 600 is used by a user 601 (e.g., a user of the software service of the present invention) to perform underlying software functions and collect data, such as data relating to events occurring with respect to the underlying software. The data may be input or received, for example, at a terminal 602.

Data may be transmitted among the terminal 602 and a server or other network device 606 (e.g., for analysis of errors) via a network (e.g., the Internet) 610, and couplings 611, 613. The terminal 602 may comprise, for example, a PC, minicomputer, mainframe computer, microcomputer, telephone device, PDA, or other device having a processor and input/output capability. The server 606 may comprise, for example, a PC, minicomputer, mainframe computer, microcomputer, or other device having a processor and a repository for data or that is capable of accessing a repository of data. Couplings 611, 613 may include wired, wireless, or fiberoptic links.

Figure 25:
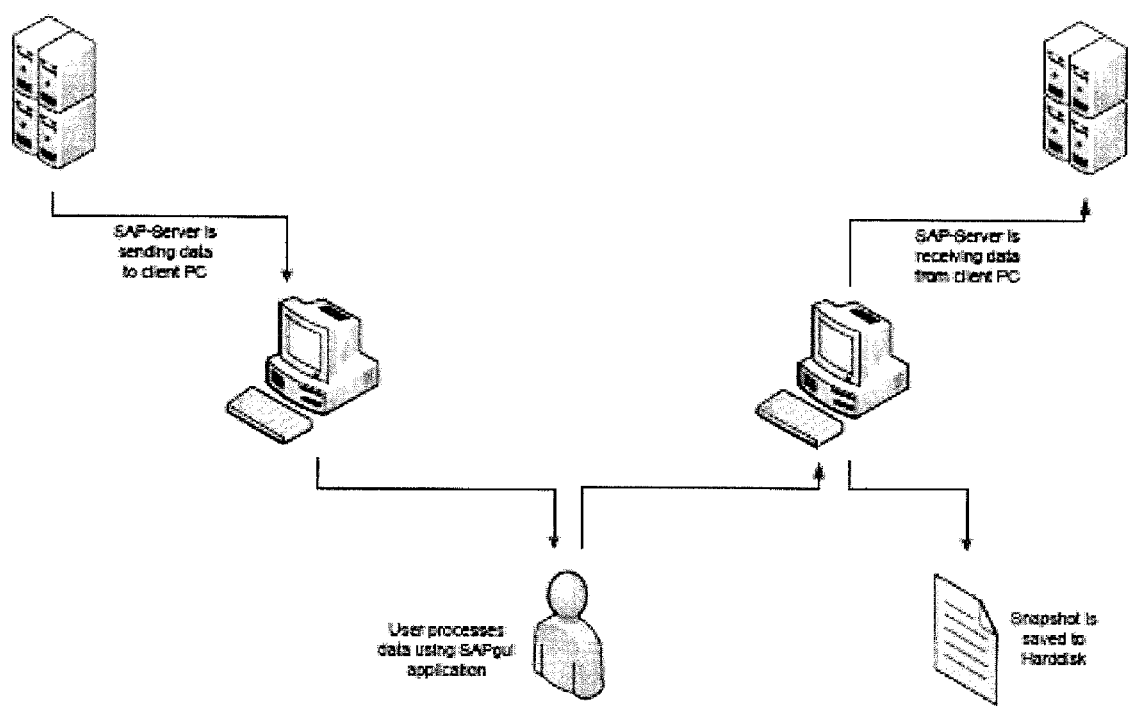
FIG. 25 shows various system components and functions relating to an exemplary data recording plugin for a SAPgui, in accordance with aspects of the present invention.
Figure 26:
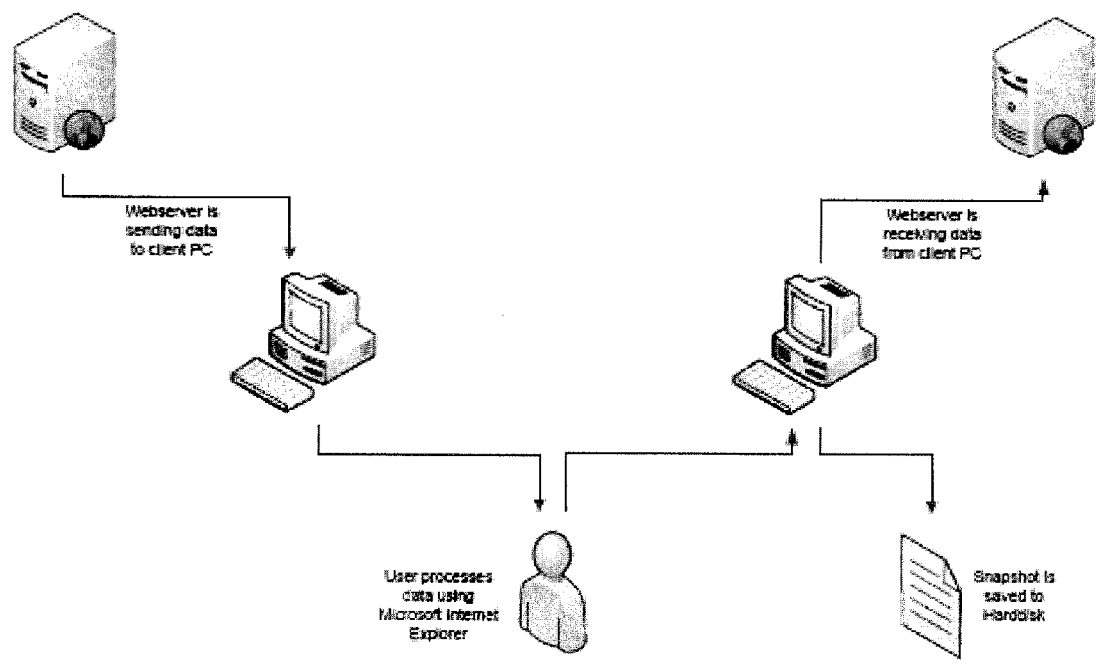
FIG. 26 shows various system components and functions relating to an exemplary data recording plugin for Microsoft® Internet Explorer, in accordance with aspects of the present invention.

FIG. 25 shows various system components and functions relating to an exemplary data recording plugin for an SAPgui, in accordance with an embodiment of the present invention.

FIG. 25 shows various system components and functions relating to an exemplary data recording plugin for Microsoft® Internet Explorer, in accordance with aspects of the present invention.

Figure 27:
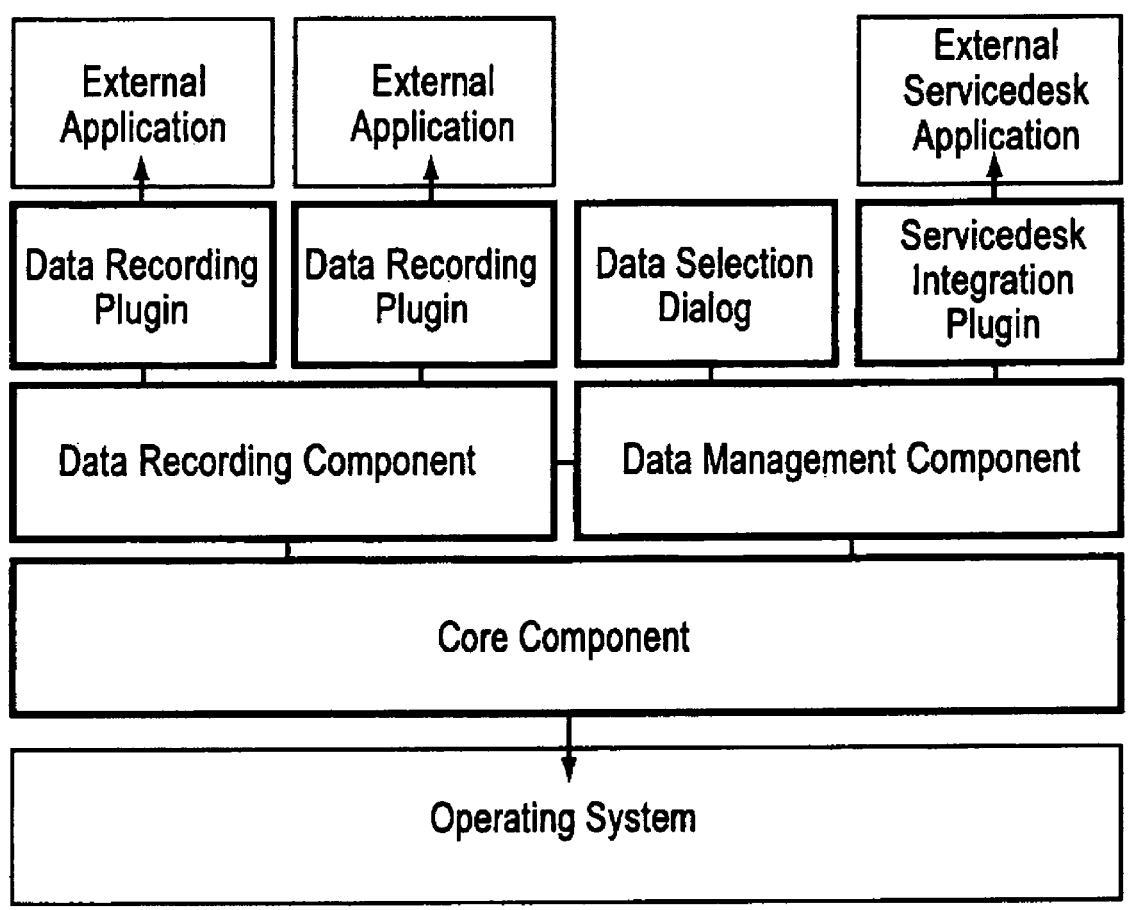
FIG. 27 shows a diagram illustrating the technical structure of an exemplary variation of the present invention.

FIG. 27 shows a diagram illustrating the technical structure of an exemplary variation of the present invention. In FIG. 27, the Core Component contains the fundamental program components, such as the license and plugin management, the representation of the application in the system tray and nonplugin-specific configuration dialogs, and the Data Management Component handles the management and reorganization of collected data, as well as handling the relevance evaluation for individual error situations. The Data Recording Component represents the common interface for all Data Recording Plugins and handles communication among Data Recording Plugins and other components of the Proactive Data Recording Service in accordance with aspects of the present invention. Data Recording Plugins are the actual interface between Proactive Data Recording Service and the external applications that should be monitored. These Plugins implement the application-specific data collection and filtering, the determination of suitable points in time for taking screenshots, as well as the transmission of data to the Data Recording component. In addition, Data Recording Plugins can contain functions for the evaluation of data records regarding relevance for a specific error or regarding the relevance for the purpose of determining whether to delete data. The Data Selection Dialog is a user interface that allows selection of recorded data for use in event reporting (e.g., for including within a reporting email message) or for use with third party tools (e.g., for software that does not offer a Servicedesk Integration Plugin), and the Servicedesk integration Plugins allow direct integration between an external servicedesk application and the present invention's Proactive Data Recording Service in accordance with aspects of the present invention.

According to aspects of the present invention, the actual data recording is implemented by the Data Recording Plugins which handle monitoring of the target application(s) and user actions relating thereto. These Plugins also handle filtering of collected data. If an application condition is classified as recording relevant, then a new data record is created. This data, also referred to interchangeably herein as a "snapshot," is then transmitted to the Data Management Component. Each snapshot contains a set of base data, as well as application-specific complementary data and attachments (such as screenshots). The following information may be included in each snapshot: 1) Application identification (ID); 2) Session ID; 3) Timestamp; 4) Executable path; 5) Executable name; 6) Executable version; 7) Computer name; 8) User ID; 9) Operating system and service pack level; and 10) Attachment container.

In addition, a Data Recording Plugin can include other data in the snapshot. The following data may be recorded by the Data Recording Plugins for SAP GUI: 1) Application Server; 2) SAP System ID; 3) Client; 4) SAP User ID; 5) Language; 6) Transaction code; 7) Program; 8) Screen number; 9) Screen title; 10) Response time; 11) Connection type; and 12) Codepage. For Internet Explorer, the recorded data may be: 1) URL; 2) Installed Plugins; 3) Current security settings; 4) Connection setting (Proxy, etc.); and/or 5) Current zone. According to aspects of the present invention, a snapshot is saved on the file system in Extensible Markup Language (XML) format. For performance and transparency reasons, binary attachments, such as screenshots, are not included in the XML-files. The snapshot file contains only the file name of the associated attachments. In order to prevent manipulation of snapshot files, some variations of the present invention's Proactive Data Recording Service support signed XML files. Screenshots can be formatted using a user specified template, and additional information can be automatically added as text before saving. Therefore, the screenshots themselves can provide some context-specific information that may help with location of errors and/or performance of other functions.

According to various aspects of the present invention, the Data Recording Plugin for SAP GUI manages communication between the present invention's Proactive Data Recording Service and an SAP frontend, also referred to interchangeably herein as SAPgui. In order to establish the connection, the plugin searches the system process table for running SAPgui processes and then determines a reference to the corresponding ActiveX Object by using SAPgui scripting.

Currently existing SAPgui sessions can be determined by querying the running SAPgui instance. The creation of a new session or the destruction of an existing session is tracked by catching the corresponding events. In this way, the Proactive Data Recording Service always has the list all active SAP session. For each session, a set of Event dealers is registered, in order to track user activities. The following events may be handled: 1) Activate window containing a SAPsession; 2) Display SAPgui context menu; 3) Change field contents; 4) Send data to SAP Server; and/or 5) Receive data from SAP Server. The termination of the SAP Frontend process is recognized by checking for invalid ActiveX object references. In this case, the Plugin remains inactive until a new SAPgui-process is discovered using method described above.

From a technical point of view, a SAP session behaves very similarly to an application running inside a web browser. First, the server sends all data required for display to the user interface on the frontend. Then, the user modifies some of the data, and finally, the result is sent back to the server. At server delivery time, all data that has been sent to the server is visible to the SAPgui, and therefore this point in time is ideal for saving a snapshot. Thus, the series of snapshots taken by the plugin contain exactly the information necessary for reproduction of the user actions.

Furthermore, when the user needs to create a problem report for the support team, he/she requires a user interface in order to put together the relevant information. This interface is also referred to interchangeably herein as a Data Selection Dialog. It shows the recorded snapshots and provides suggestions concerning the relevant snapshots. Each individual snapshot is able to be evaluated for relevance. Usually an error occurs in the same application and in the same session in which the actions causing the error have been carried out. Therefore the snapshots are first grouped by application and session ID. The session in which the error occurred is shown as the first session in the list, and all other sessions are sorted by the time interval between the last snapshots recording before the error and the time the error occurred. If no appropriate snapshot is present or if a snapshot belongs to another application, such a session will be shown at the end of the list. The snapshots belonging to a certain session are also shown hierarchically, in chronological order. A preselection is created based on a candidate list that contains all snapshots belonging to the session in which the error occurred. Snapshots that were recorded after the error occurred are ignored. These candidates are then evaluated using a scoring system. The higher the score of a snapshot, the higher its relevance for the preselection. The snapshots contained in the candidate list are processed in chronological order until a snapshot receives a score that is lower than zero. All snapshots that have been evaluated before this condition occurred are included in the preselection.

With respect to memory management, the snapshots that can be deleted are first identified using a fixed set of criteria. If the amount of memory used by the remaining snapshots exceeds the maximum amount of memory to be used, these snapshots will be evaluated and sorted by score, and listed in descending order. Then, the first snapshot in the list will be deleted. If the remaining snapshots still consume too much memory, the next snapshot in the list will be deleted and so on. The following criteria may be used to determine the snapshots that can be deleted immediately: Snapshot is older than the interval defined in the parameter snapshot retention time.

Example aspects of the present invention have now been described in accordance with the above advantages. It will be appreciated that these examples are merely illustrative of variations of the present invention. Many other variations and modifications will be apparent to those skilled in the art.

What is claimed is:

1. A method of system error management, comprising:
   recording data from an operating system, or from one or more applications running on the operating system, at regular intervals;
   detecting at least one error occurring during operation of the operating system and the one or more applications; and
   determining a most likely event for the occurrence of the at least one error;
   wherein the data comprises at least one selected from a group consisting of actions of the user, metadata, and screen views of user interface screens displayed by the operating software or by any of the one or more applications.

2. The method of claim 1, wherein the recorded data is stored in a storage buffer and is purged at regular intervals.

3. The method of claim 1, wherein recording data from the operating system or from the one or more applications is performed by a software running in background.

4. The method of claim 1, wherein determining the most likely event for the occurrence of the at least one error comprises:
   using probability information or scoring of the data.

5. The method of claim 1, further comprising:
   a user provided with a selectable option to maintain confidentiality of the data and the determined most likely event.

6. The method of claim 2, wherein the at least one error is displayed to a user.

7. The method of claim 6, wherein the error is reported by the user by urging the displayed error on the popup screen.

8. The method of claim 6, wherein the user adds additional information to the recorded data.

9. The method of claim 1, wherein the metadata comprises at least one selected from a group consisting of a time when the data was recorded, a client name, a user name, a language used, an indication of whether the user was logged on, an identity of a transaction in which the user was involved, an active program involved when the at least one error occurred, and an active screen involved when the at least one error occurred.

10. The method of claim 1, further comprising:
    transmitting the recorded data to a remote location for analysis in analog form or digital form.

11. The method of claim 1, wherein the data is recorded at periodic intervals.

12. The method of claim 2, wherein a size of the storage buffer is determined by a user.

13. The method of claim 1, wherein a plurality of errors are detected, the method further comprising:
    prioritizing the plurality of errors.

14. A system for error management, the system comprising:
    means for recording data from an operating system, or from one or more applications running on the operating system, at regular intervals;
    means for detecting at least one error occurring during operation of the operating system or of one or more of the applications running on the operating system; and
    means for determining a most likely event for the occurrence of the at least one error;
    wherein the data comprises at least one selected from a group consisting of actions of the user, metadata, and screen views of user interface screens displayed by the operating software or by any of the one or more applications.

15. A system for error management in an operating system, the system comprising:
    a processor;
    a user interface functioning via the processor; and
    a repository accessible by the processor; wherein
    data from an operating system or from one or more applications running on the operating system is recorded at regular intervals;
    at least one error is detected during operation of the operating system or of one or more of the applications running on the operating system; and
    a most likely event for the occurrence of the at least one error is determined;
    wherein the data comprises at least one selected from a group consisting of actions of the user, metadata, and screen views of user interface screens displayed by the operating software or by any of the one or more applications.

16. The system of claim 15, wherein the processor is housed on a terminal.

17. The system of claim 16, wherein the terminal is selected from a group consisting of a personal computer, a minicomputer, a main frame computer, a microcomputer, a hand held device, and a telephonic device.

18. The system of claim 15, wherein the processor is housed on a server.

19. The system of claim 18, wherein the server is coupled to a network.

20. The system of claim 19, wherein the network is the Internet.

21. A computer program product comprising a computer usable storage medium having control logic stored therein for causing a computer to error manage, the control logic comprising:
    first computer readable program code means for recording data from an operating system or from one or more applications running on the operating system at regular intervals;
    second computer readable program code means for detecting at least one error occurring during operation of the operating system or of one or more of the applications running on the operating system; and
    third computer readable program code means for determining a most likely event for the occurrence of the at least one error;
    wherein the data comprises at least one selected from a group consisting of actions of the user, metadata, and screen views of user interface screens displayed by the operating software or by any of the one or more applications.

22. The method of claim 1, wherein recording the data comprises recording data from the operating system of a single computer.

* * * * *